(12) United States Patent
Terao

(10) Patent No.: US 8,290,159 B2
(45) Date of Patent: Oct. 16, 2012

(54) DATA RECOVERY METHOD, IMAGE PROCESSING APPARATUS, CONTROLLER BOARD, AND DATA RECOVERY PROGRAM

(75) Inventor: Yuichi Terao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 759 days.

(21) Appl. No.: 12/048,878

(22) Filed: Mar. 14, 2008

(65) Prior Publication Data

US 2008/0226081 A1 Sep. 18, 2008

(30) Foreign Application Priority Data

Mar. 16, 2007 (JP) ................................. 2007-069651
Mar. 16, 2007 (JP) ................................. 2007-069652

(51) Int. Cl.
*H04L 9/00* (2006.01)
(52) U.S. Cl. ............. 380/227; 713/2; 707/640; 707/674
(58) Field of Classification Search .................. 380/277; 713/2; 707/640, 674

See application file for complete search history.

(56) References Cited

U.S. PATENT DOCUMENTS

| 7,240,219 | B2 * | 7/2007 | Teicher et al. | 713/193 |
| 7,496,756 | B2 * | 2/2009 | Oka et al. | 713/175 |
| 7,559,622 | B2 * | 7/2009 | Tanaka | 347/23 |
| 7,734,934 | B2 * | 6/2010 | Zimmer et al. | 713/193 |
| 2004/0061885 | A1 * | 4/2004 | Ikeno | 358/1.11 |
| 2004/0208316 | A1 * | 10/2004 | Wack et al. | 380/44 |
| 2006/0209116 | A1 * | 9/2006 | Tanaka | 347/19 |
| 2007/0055894 | A1 * | 3/2007 | Osaki | 713/193 |

FOREIGN PATENT DOCUMENTS

| JP | 2002-368735 A | 12/2002 |
| JP | 2004-201038 | 7/2004 |
| JP | 2005-158043 | 6/2005 |
| JP | 2005-327235 A | 11/2005 |
| JP | 2006-163956 | 6/2006 |
| JP | 2006-237689 A | 9/2006 |
| JP | 2007-195110 A | 8/2007 |
| WO | WO99/38078 | 7/1999 |

* cited by examiner

*Primary Examiner* — Jason K. Gee
*Assistant Examiner* — Abiy Getachew
(74) *Attorney, Agent, or Firm* — Oblon, Spivak, McClelland, Maier & Neustadt, L.L.P.

(57) ABSTRACT

A disclosed data recovery method, image processing apparatus, controller board, and data recovery program enable data stored encrypted in a storage unit within an information processing apparatus to be recovered when an internal encryption key of the apparatus becomes unavailable. A first encryption key is stored in a secure memory, a second encryption key is stored in a first storage unit, and data is stored in a second storage unit. The second encryption key is decrypted with the first encryption key. The second encryption key is backed up outside the information processing apparatus as a backup key, such as by printing it on a sheet with a plotter. When the first encryption key becomes unavailable, the backup key is restored back in the information processing apparatus. The data stored in the second storage unit is then decrypted with the restored backup key.

20 Claims, 33 Drawing Sheets

FIG.19

| SERIAL No | KEY INFORMATION |
|---|---|
| A00001 | Qkfa;ksdhfDeafghasdq |
| A00002 | Gjlkfdjslkahk;jafbed |
| B00001 | Asdjflkjadslkjfawlpa |
| B00002 | Lasmdalskjflsdajfmii |
|  |  |

FIG.22

| SERIAL No | PASSWORD | KEY INFORMATION |
|---|---|---|
| A00001 | "Password1" | Qkfa;ksdhfDeafghasdq |
| A00002 | "Password2" | Gjlkfdjslkahk;jafbed |
| B00001 | "Password3" | Asdjflkjadslkjfawlpa |
| B00002 | "Password4" | Lasmdalskjflsdajfmii |
| | | |

FIG.25

FROM : mfpadmin@ xx.xxx.co.jp
TO    : user_a@xxx.xxx.co.jp

---

DEAR USER A :
THIS MAIL IS REQUIRED WHEN RECOVERING YOUR INFORMATION UPON REPLACEMENT OF BOARD.

YOU CAN RECOVER DATA BY SENDING THIS MAIL TO COPIER IN WHICH NEW BOARD IS SET.

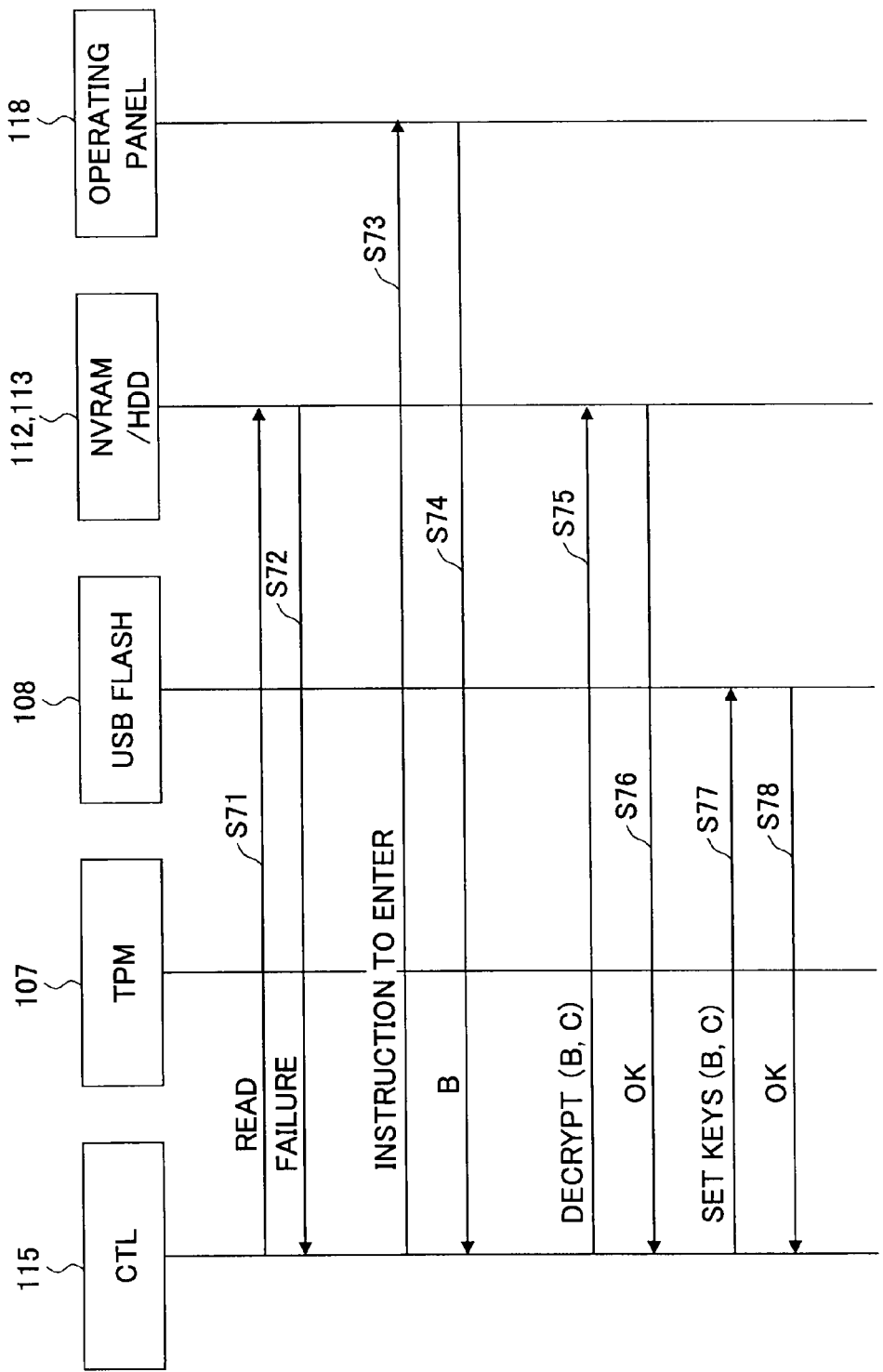

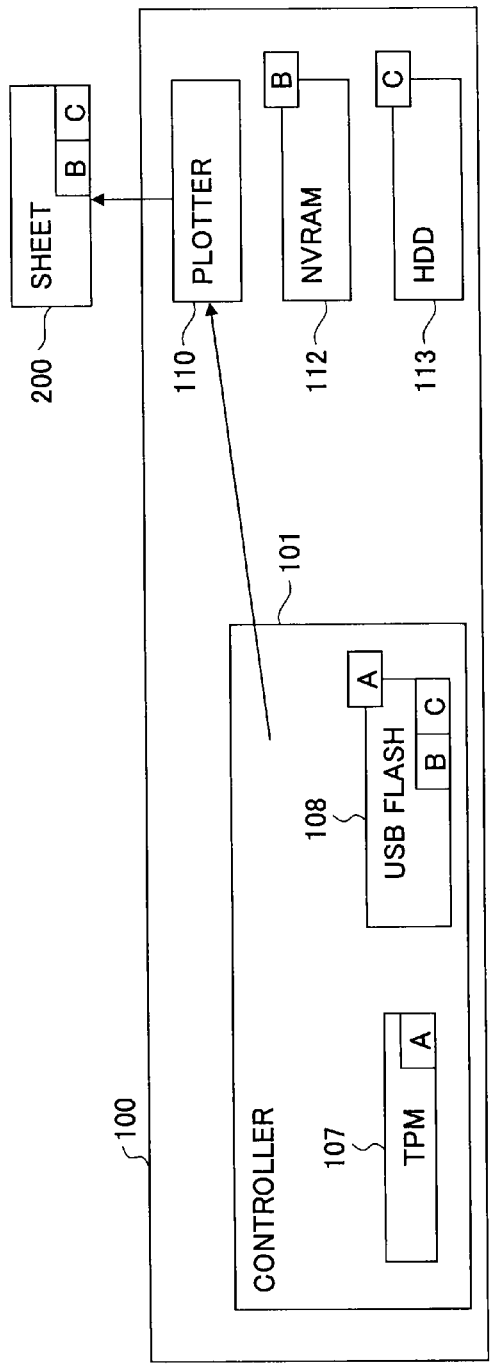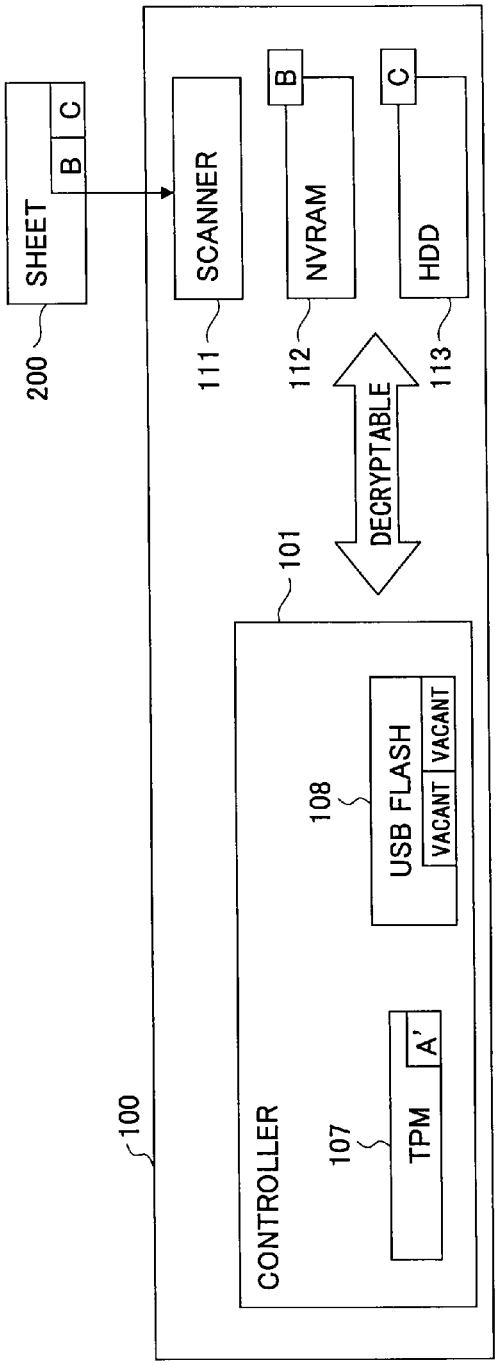

DATA RECOVERY METHOD, IMAGE PROCESSING APPARATUS, CONTROLLER BOARD, AND DATA RECOVERY PROGRAM

BACKGROUND OF THE INVENTION

1. Field of the Invention

The present invention relates to data recovery methods, image processing apparatuses, controller boards, and data recovery programs. Particularly, the invention relates to a data recovery method, an image processing apparatus, a controller board, and a data recovery program as they relate to the recovery of data encrypted with an encryption key.

2. Description of the Related Art

In recent years, there has been an increasing demand for security regarding peripheral devices such as printers, scanners, FAX machines, copiers, and multifunction peripherals (MFP). IEEE P2600 defines security standards with regard to these image processing apparatuses and provides for requirements concerning protection of data saved within a device.

Specifically, in the field of image processing apparatuses, it is necessary to prevent theft or analysis of storage devices in which user data, such as an address book and image information, and security data such as a security log are stored, in order to protect such user data and security data. In one method of protecting such user data and security data stored in a storage device, encryption of certain strength may be employed (see Japanese Laid-Open Patent Application Nos. 2005-158043 and 2004-201038; and WO99/038078, for example).

In another method of protecting user data and security data stored in a storage device, an encryption key may be stored in a Trusted Platform Module (TPM) to prevent its leakage.

In personal computers and workstations, users generally enter their own passwords each time they start up the device. On the other hand, an image processing apparatus such as a multifunction peripheral is typically used by multiple users (or operators), any one of whom may turn on or off the device. In this mode of use of an image processing apparatus, it is not viable to tell the users that they have to enter a password each time they start up even if the purpose is to protect their user data.

In a conventional image processing apparatus, an encryption key for a storage device in which user data and the like are stored is automatically generated, and the encryption key is encrypted with another encryption key stored in a TPM. The encrypted encryption key is then saved in a nonvolatile device, such as a nonvolatile memory on the controller board.

In this conventional image processing apparatus, it is difficult to decode the storage device even if the storage device is stolen.

However, in such a conventional image processing apparatus, if it becomes necessary to replace the controller board due to defective components or the end of life of a component, the user data and the like stored encrypted in the storage device cannot be decrypted.

In practice, it is rare in the case of household appliances such as a multifunction peripheral to replace only those components on the controller board that have failed; more generally, the entire controller board is replaced. Thus, it can be expected that replacement of controller boards frequently occurs in image processing apparatuses. In the case of an image processing apparatus such as a multifunction peripheral, it is inconvenient if the user data and the like cannot be decrypted whenever a controller board is replaced.

SUMMARY OF THE INVENTION

It is therefore a general object of the present invention to overcome the aforementioned problems. A more specific object is to provide a data recovery method, an image processing apparatus, a controller board, and a data recovery program whereby data stored encrypted in a storage unit within an apparatus can be recovered if an internal encryption key becomes unavailable.

In one aspect, the invention provides a data recovery method for an information processing apparatus in which a first encryption key is stored in a secure memory, a second encryption key encrypted with the first encryption key is stored in a first storage unit, and data encrypted with the second encryption key is stored in a second storage unit. The data recovery method comprises a back-up step in which the second encryption key is decrypted with the first encryption key and backed up outside the information processing apparatus as a backup key; a restoring step in which, when the first encryption key is unavailable, the backup key is restored within the information processing apparatus; and a decrypting step in which data stored in the second storage unit is decrypted using the backup key restored within the information processing apparatus.

In another aspect, the invention provides an image processing apparatus including at least either a plotter or a scanner, wherein a first encryption key is stored in a secure memory, a second encryption key encrypted with the first encryption key is stored in the first storage unit, and data encrypted with the second encryption key is stored in the second storage unit. The apparatus comprises a backup unit configured to decrypt the second encryption key with the first encryption key, and configured to back up the second encryption key outside the apparatus as a backup key; a restore unit configured to restore the backup key within the apparatus when the first encryption key is unavailable; and a decrypting unit configured to decrypt data stored in the second storage unit using the backup key restored within the apparatus.

In yet another aspect, the invention provides an image processing apparatus including a plotter, wherein a first encryption key is stored in a secure memory, a second encryption key encrypted with the first encryption key is stored in a first storage unit, and data encrypted with the second encryption key is stored in a second storage unit. The apparatus comprises a backup unit configured to decrypt the second encryption key with the first encryption key, and configured to cause the plotter to print the second encryption key on a sheet as a backup key; a restore unit configured to restore the backup key using the sheet on which the backup key is printed, when the first encryption key is unavailable; and a decrypting unit configured to decrypt data stored in the second storage unit using the backup key restored within the apparatus.

The present invention may also be embodied in various other methods, devices, systems, computer programs, recording media, or data structures in which the constituent elements, expressions, or any combination of the elements of the invention are applied.

Thus, in accordance with the present invention, data stored encrypted in a storage unit of an apparatus can be recovered even when an internal encryption key of the apparatus becomes unavailable.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 19 shows an example of a server table;

FIG. 22 shows an example of a server table;

FIG. 25 shows an example of mail transmitted to a user;

FIG. 32 shows a sequence chart of the start-up sequence of the multifunction peripheral of FIG. 28;

FIG. 33A shows a multifunction peripheral before replacement of the controller board according to another embodiment of the invention;

FIG. 33B shows the multifunction peripheral of FIG. 33A after replacement of the controller board;

DETAILED DESCRIPTION OF THE PREFERRED EMBODIMENTS

In the following, preferred embodiments of the present invention are described with reference to the drawings. While the following embodiments are described with reference to a multifunction peripheral as an example of an information processing apparatus and an image processing apparatus, the invention may be embodied using other devices or equipment.

Before describing the various embodiments of the invention, hardware and software aspects of an apparatus are discussed that forms the basis of the invention and its problems that are solved by the embodiments.

Figure 1:
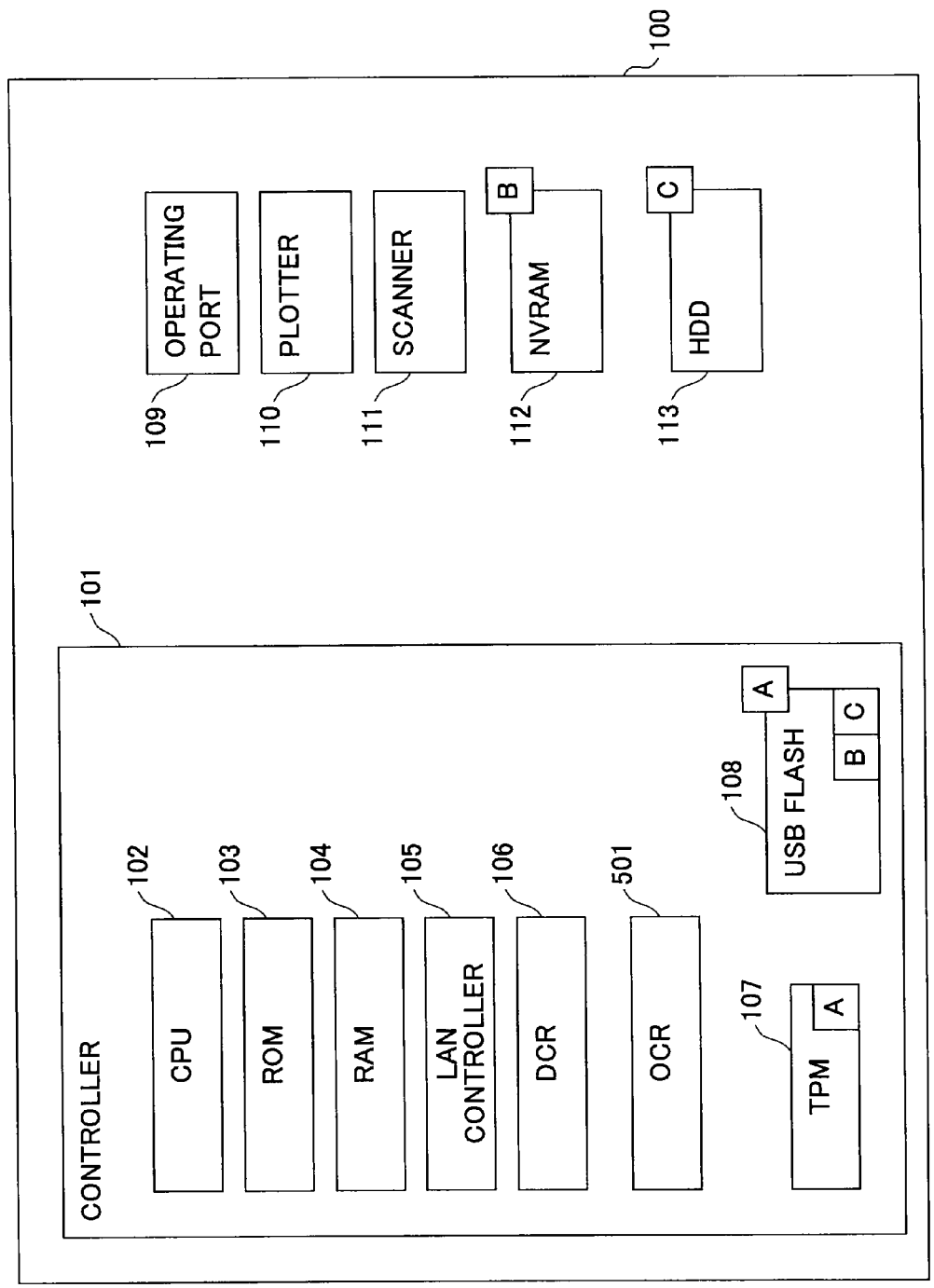
FIG. 1 shows a hardware configuration of a multifunction peripheral according to an embodiment of the invention.

FIG. 1 shows an exemplary hardware configuration of a multifunction peripheral 100, which comprises a controller board 101; an operating port 109; a plotter 110; a scanner 111; a non-volatile random access memory (NVRAM) 112; and a hard disc drive (HDD) 113. The controller board 101 includes a central processing unit (CPU) 102; a read only memory (ROM) 103; a random access memory (RAM) 104; a local area network (LAN) controller 105; a DCR 106; a TPM 107; a Universal Serial Bus (USB) flash memory 108; and an optical character reader (OCR) 501.

The controller board 101 is a mother board configured to control the overall function of the multifunction peripheral 100. The CPU 102 is configured to perform operating processes. The ROM 103 may store programs. The RAM 104 may save or temporarily store programs or data. The LAN controller 105 is configured to connect a network such as an Ethernet (registered trademark) network or a wireless LAN. The DCR 106 converts image information (bit map information) into an electronic document.

The TPM 107 is a chip direct-mounted on the controller board 101. Japanese Laid-Open Patent Application No. 2004-282391 teaches encryption of information using a TPM in a personal computer in accordance with a specification put forward by Trusted Computing Platform Alliance (TCPA). The TPM 107 is an example of a secure memory. The USB flash memory 108 is an example of a nonvolatile memory. The OCR 501 is configured to read printed text information and encode it.

The operating port 109 is configured to enable the input and output of user operations. The plotter 110 may print image information on a sheet. The scanner 111 may read image information on a sheet. The NVRAM 112 is an example of a nonvolatile memory and a storage device. The NVRAM 112 may retain various parameters. The HDD 113 may contain large volumes of data, such as an address book and image information. The HDD 113 is an example of a storage device.

The multifunction peripheral 100 is configured to save within the TPM 107 an encryption key A for encrypting and decrypting encryption keys B and C. The multifunction peripheral 100 is also configured to save within the USB flash memory 108 the encryption keys B and C encrypted with the encryption key A. The encryption key B is used to encrypt or decrypt the NVRAM 112. The encryption key C is used to encrypt or decrypt the HDD 113.

Figure 2:
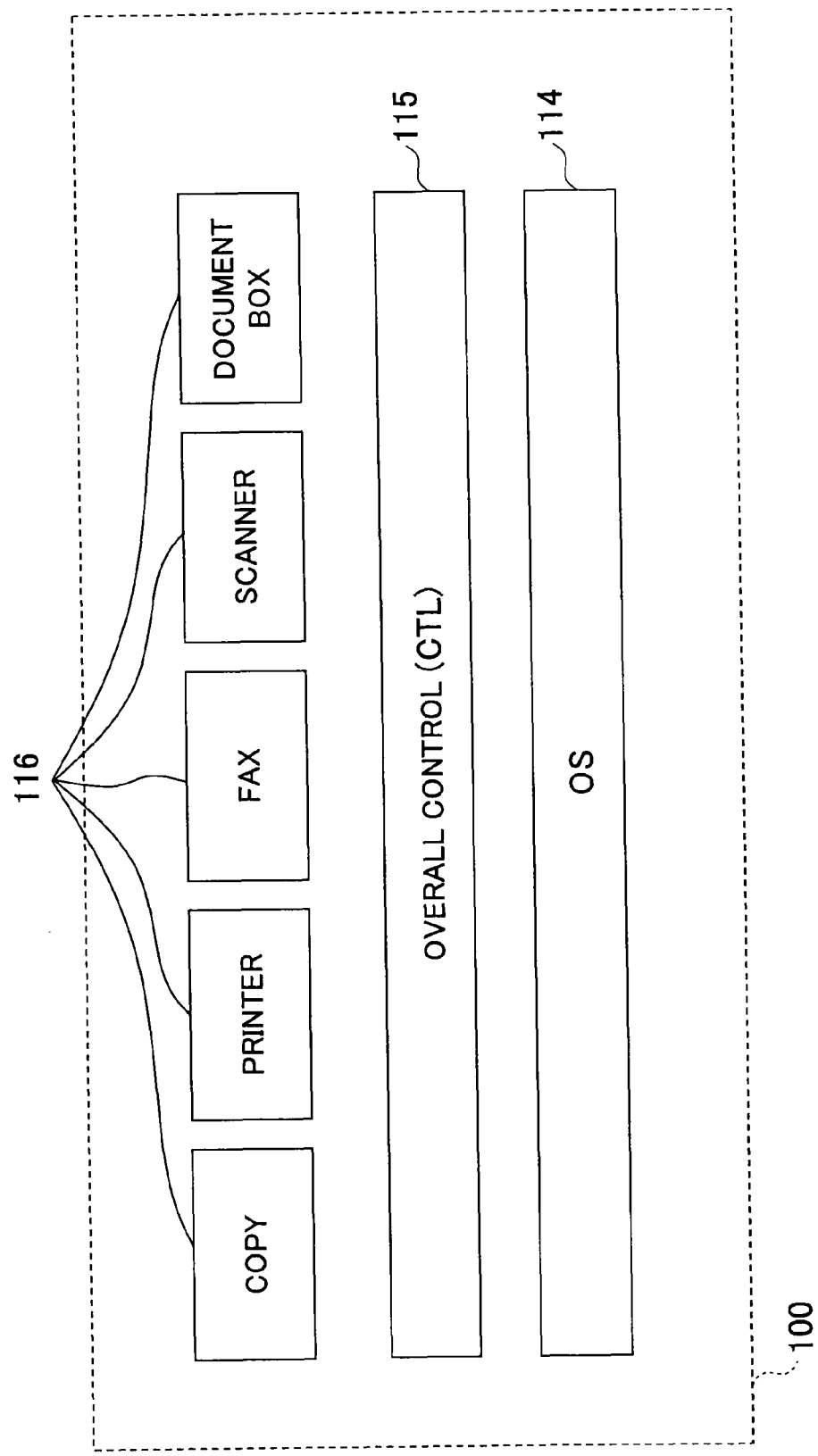
FIG. 2 shows a software configuration of the multifunction peripheral of the embodiment of FIG. 1.

FIG. 2 shows an example of a software configuration of the multifunction peripheral 100. The multifunction peripheral 100 comprises an operating system (OS) 114; overall control software (CTL) 115; and application control software 116 including copy software, printer software, FAX software, scanner software, and document box software.

The OS 114 is the software for managing various resources. The CTL 115 is configured to tally and exchange data with each software item in the application control software 116. The application control software 116 controls each application of the multifunction peripheral 100.

Figure 3:
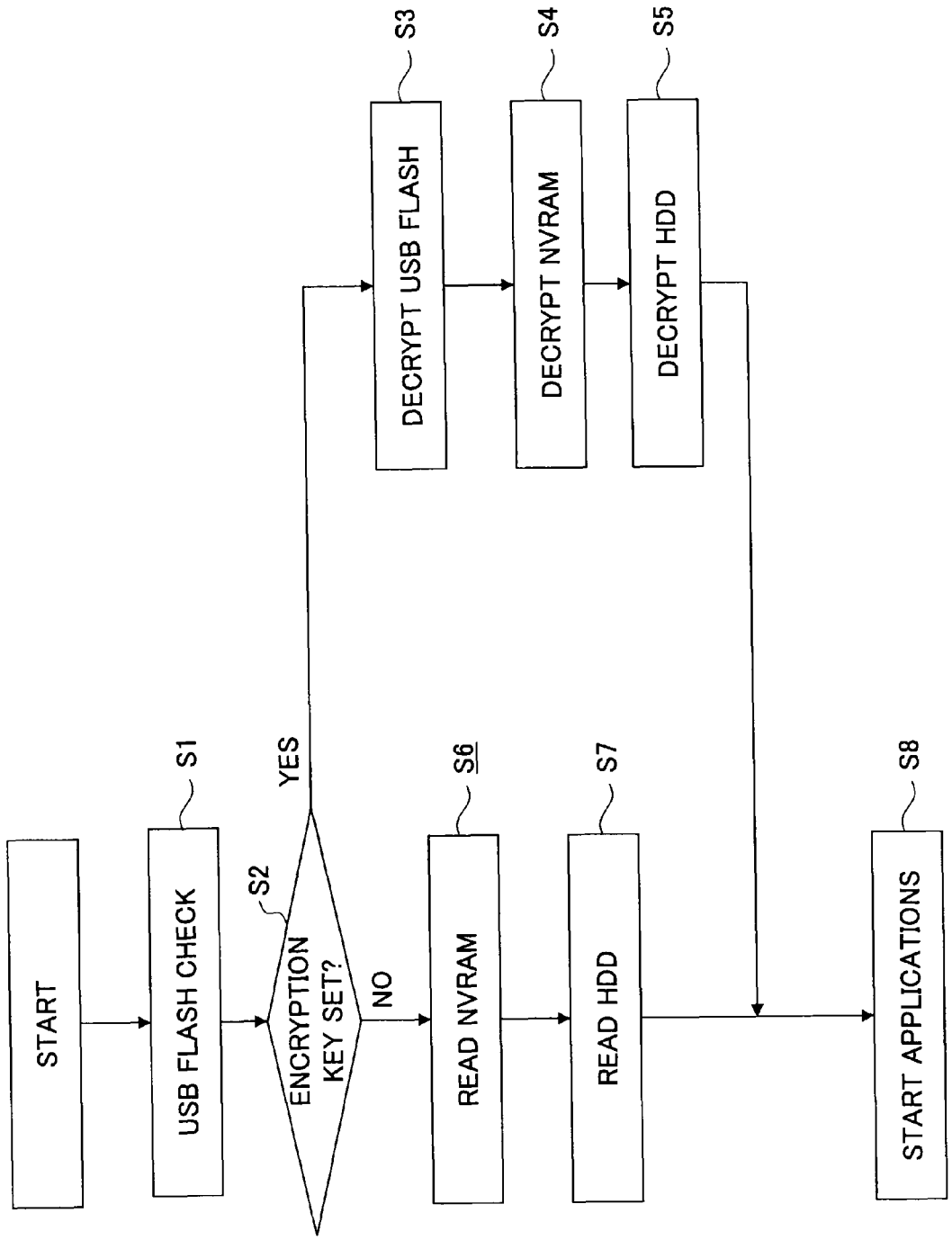
FIG. 3 shows a flowchart of a startup sequence for the multifunction peripheral of the embodiment.
Figure 4:
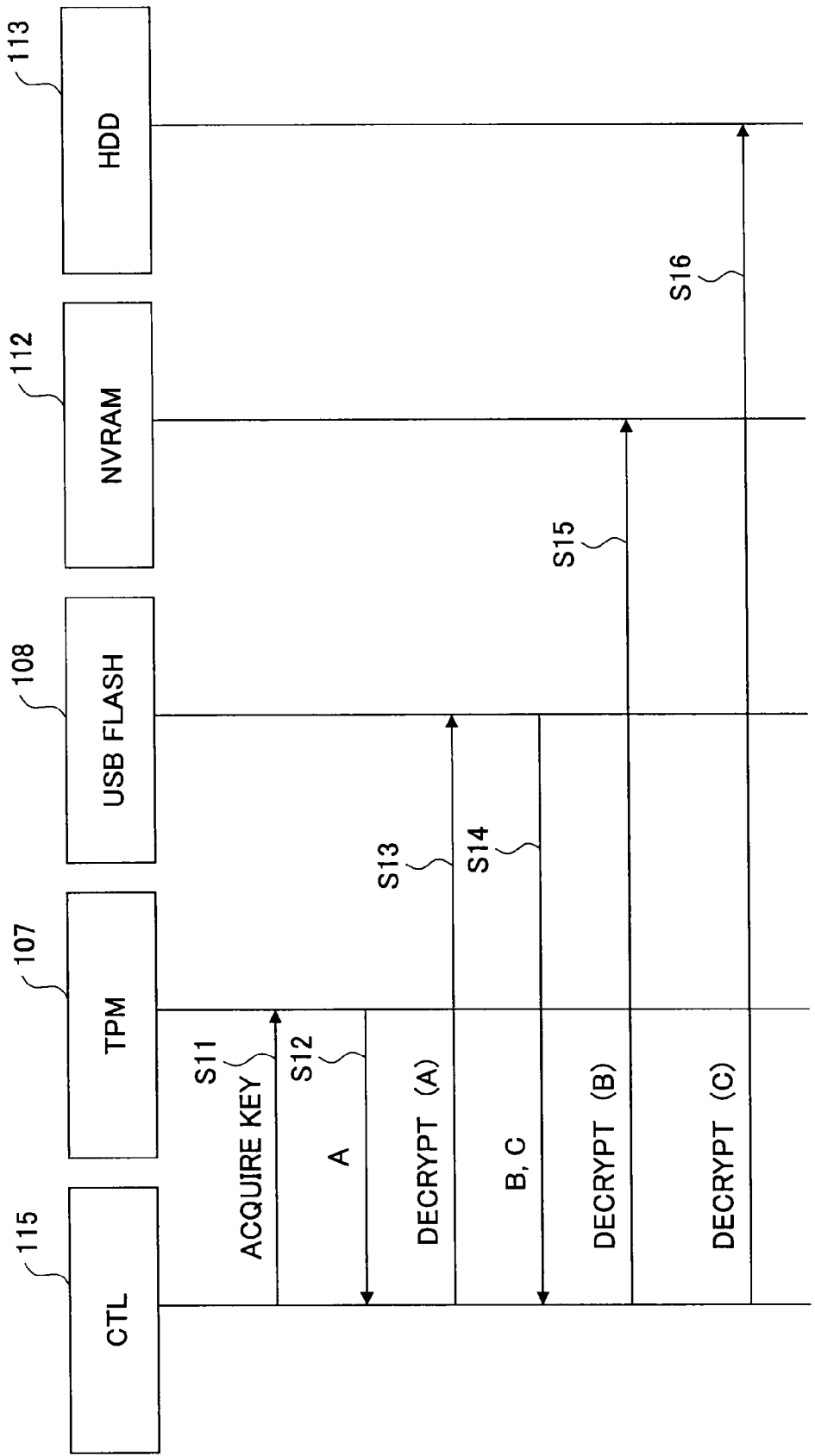
FIG. 4 shows a sequence chart of a startup sequence of the multifunction peripheral of the embodiment.

The multifunction peripheral 100 shown in FIGS. 1 and 2 may be started up as shown in FIGS. 3 and 4. FIG. 3 shows a flowchart of a startup sequence of the multifunction peripheral 100. FIG. 4 shows a sequence chart of a startup sequence of the multifunction peripheral 100.

With reference to the flowchart of FIG. 3, after the multifunction peripheral 100 is turned on, the CTL 115 acquires the encryption key A from the TPM 107 and determines in step S1 whether an encryption key is set in the USB flash memory 108. If an encryption key is set (YES in S2), the CTL 115 in step S3 decrypts the encryption keys B and C stored in the USB flash memory 108 that are encrypted with the encryption key A, using the encryption key A.

In step S4, the CTL 115 acquires the decrypted encryption key B from the USB flash memory 108, and then decrypts the NVRAM 112, with the encryption key B. In step S5, the CTL 115 acquires the decrypted encryption key C from the USB flash memory 108, and decrypts the HDD 113 with the encryption key B. In step S8, the multifunction peripheral 100 starts up each application using the application control software 116.

If an encryption key is not set (NO in S2), the CTL 115 determines that the NVRAM 112 and the HDD 113 are not encrypted. In step S6, the CTL 115 reads various parameters from the NVRAM 112. In step S7, the CTL 115 reads data from the HDD 113. In step S8, the multifunction peripheral 100 starts up each application using the application control software 116.

The sequence chart of FIG. 4 shows a startup sequence in a case where the NVRAM 112 and the HDD 113 are encrypted. After the multifunction peripheral 100 is turned on, the CTL 115, in steps S11 and S12, acquires the encryption key A from the TPM 107. In step S13, the CTL 115 decrypts the encryption keys B and C stored in the USB flash memory 108 that are encrypted with the encryption key A, using the encryption key A.

In step S14, the CTL 115 acquires the decrypted encryption keys B and C from the USB flash memory 108. In step S15, the CTL 115 decrypts the NVRAM 112 with the encryption key B. In step S16, the CTL 115 decrypts the HDD 113 with the encryption key C. The multifunction peripheral 100 then starts up each application using the application control software 116.

For ease of understanding of the present invention, a problem that arises when replacing the controller board 101 of the multifunction peripheral 100 is discussed with reference to FIG. 5, which shows a hardware configuration of the multifunction peripheral 100 of which the controller board has been replaced.

Figure 5:
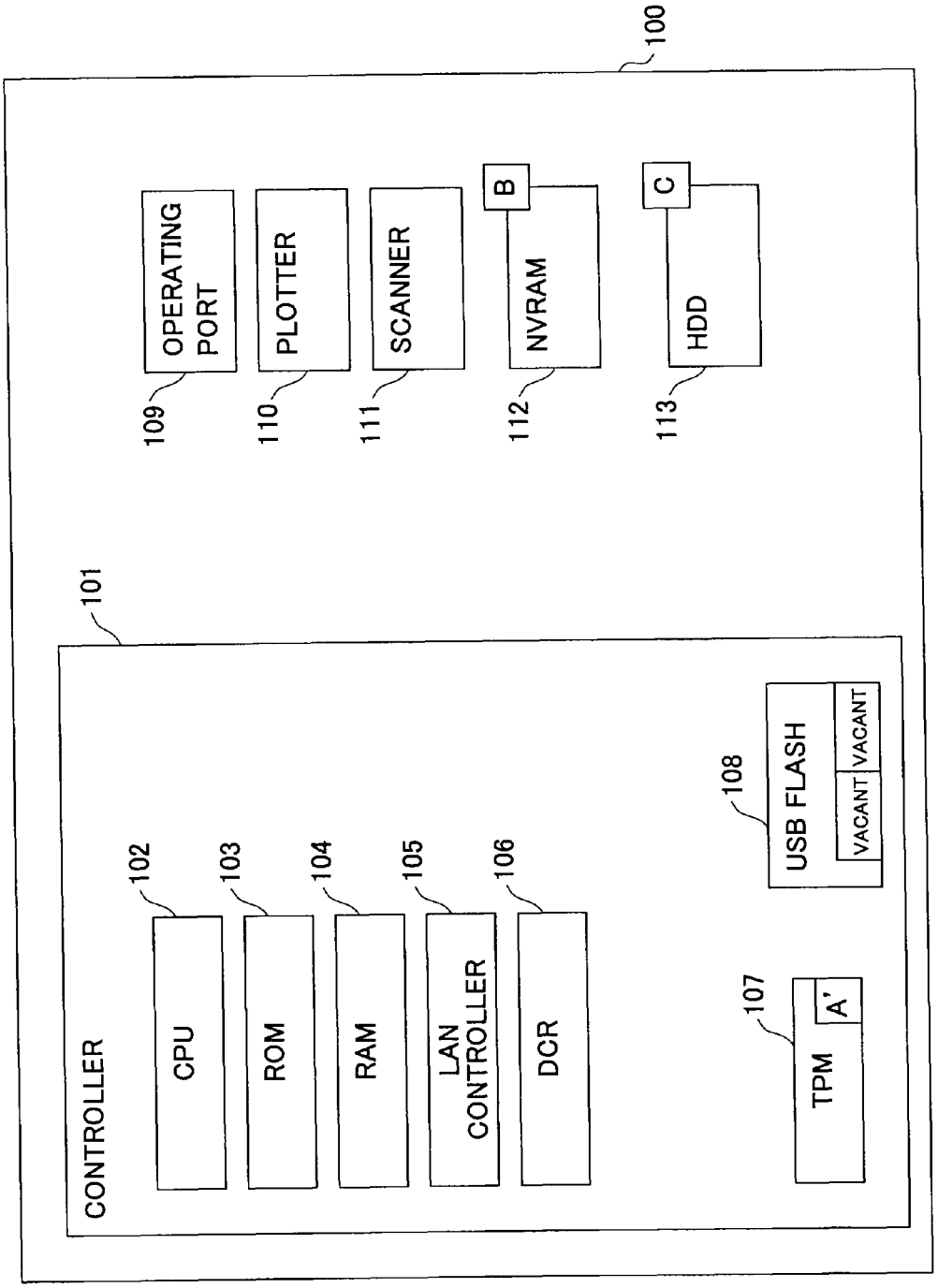
FIG. 5 shows the multifunction peripheral of the embodiment after a controller board has been replaced.

As shown in FIG. 5, the USB flash memory 108 is in an initialized status, such that the encryption keys B and C encrypted with the encryption key A are not saved therein. Therefore, the parameters or data that are encrypted with the encryption keys B and C and stored in the NVRAM 112 and the HDD 113 cannot be decrypted. As a result, it has been necessary to initialize the NVRAM 112 and the HDD 113 even though neither the NVRAM 112 nor the HDD 113 has a failure.

The TPM 107 has an encryption key A' which is different from the encryption key A with which the encryption keys B and C are encrypted or decrypted. The encryption key A' stored in the TPM 107 may differ from one controller board to another.

Embodiment 1

Figure 6:
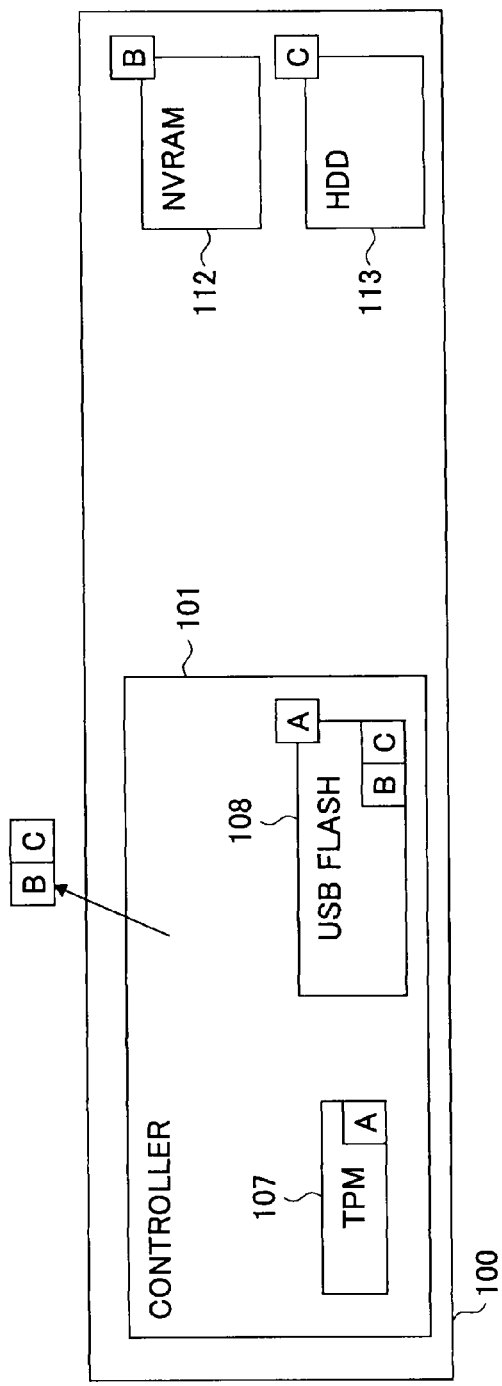
FIG. 6A shows a multifunction peripheral according to another embodiment of the invention before replacement of the controller board.
FIG. 6B shows the multifunction peripheral of FIG. 6A after replacement of the controller board.

FIGS. 6A and 6B show conceptual diagrams illustrating a data recovery method according to an embodiment of the invention. FIG. 6A shows the multifunction peripheral 100 prior to replacement of the controller board 101. FIG. 6B shows the multifunction peripheral 100 after replacement of the controller board 101.

In the multifunction peripheral 100 of the present embodiment, the encryption keys B and C saved in the USB flash memory 108 are output to the outside of the multifunction peripheral 100 via the operating panel or the like while the controller board 101 is normally operating. After replacement of the controller board 101, the encryption keys B and C that have been placed outside the multifunction peripheral 100 are brought back into the multifunction peripheral 100 via the operating panel or the like, in order to restore the encryption keys B and C back into the USB flash memory 108.

Thus, in accordance with the multifunction peripheral 100 of the present embodiment, the parameters and data stored in the NVRAM 112 and the HDD 113 that are encrypted with the encryption keys B and C can be decrypted even after replacement of the controller board 101.

Figure 7:
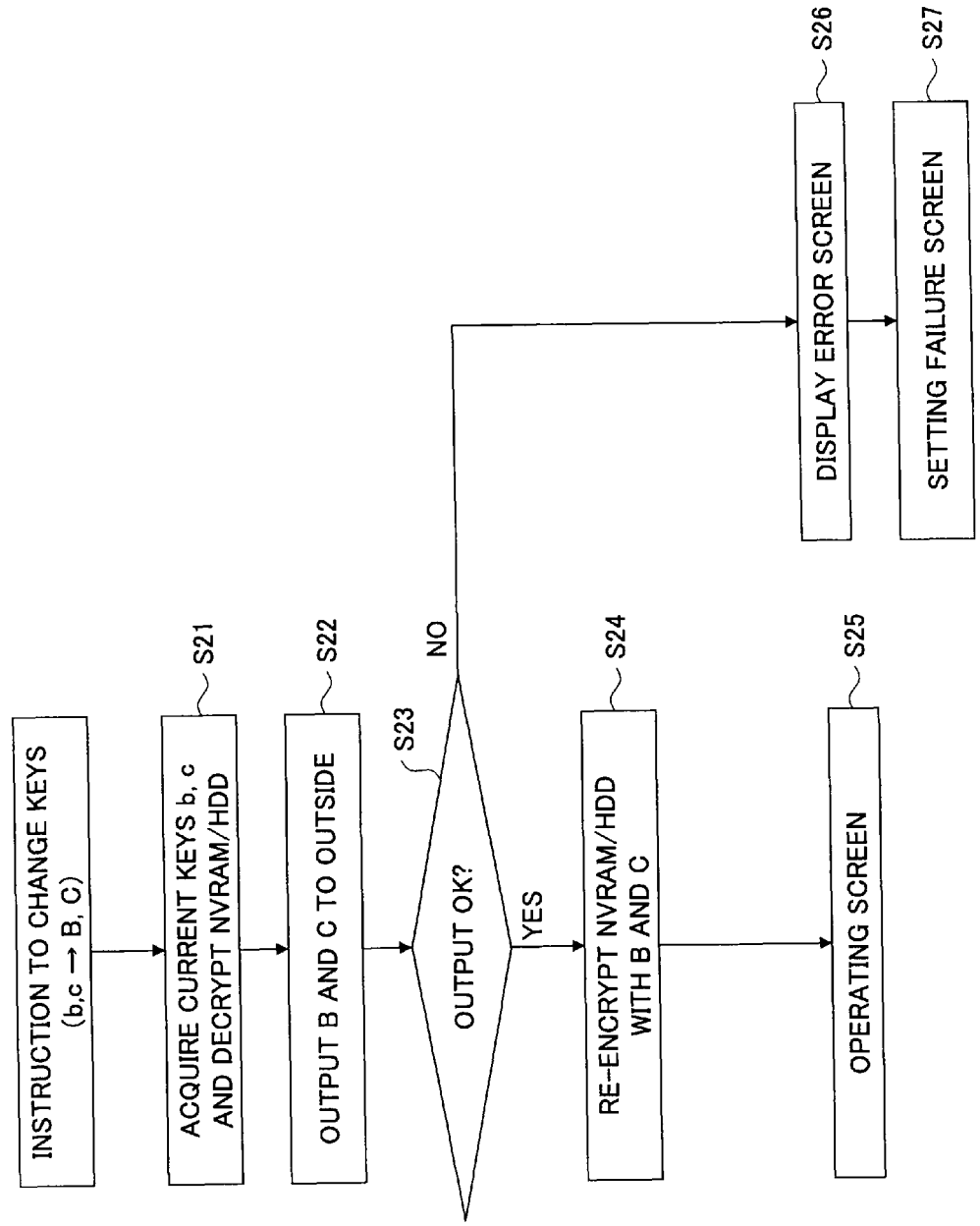
FIG. 7 shows a flowchart of an encryption key setting sequence for the multifunction peripheral of the embodiment of FIG. 6.

FIG. 7 shows a flowchart of an encryption key setting sequence of the multifunction peripheral 100 according to the present embodiment. Upon receipt of a key change instruction (encryption keys b, c encryption keys B, C) via the operating panel or a network, the CTL 115 in step S21 acquires the encryption key A from the TPM 107. The CTL 115 then decrypts the encryption keys b and c stored in the USB flash memory 108 that are encrypted with the encryption key A, using the encryption key A. After acquiring the decrypted encryption keys b and c from the USB flash memory 108, the CTL 115 decrypts the NVRAM 112 and the HDD 113 with the encryption key b and c, respectively.

In step S22, the CTL 115 outputs the new encryption keys B and C to the outside of the multifunction peripheral 100 via the operating panel or a network. In step S23, upon successful output of the encryption keys B and C to the outside (YES in S23), the CTL 115 in step S24 again encrypts the NVRAM 112 and the HDD 113 with the new encryption keys B and C.

In step S25, the CTL 115 then causes an operating screen to be displayed on the operating panel and completes the setting of the encryption keys.

On the other hand, if the CTL 115 fails to output the encryption keys B and C to the outside for some reason, such as canceling by the user (NO in S23), the CTL 115 in step S26 causes an error screen to be displayed on the operating panel. In step S27, the CTL 115 causes an encryption key setting failure screen to be displayed on the operating panel.

Figure 8:
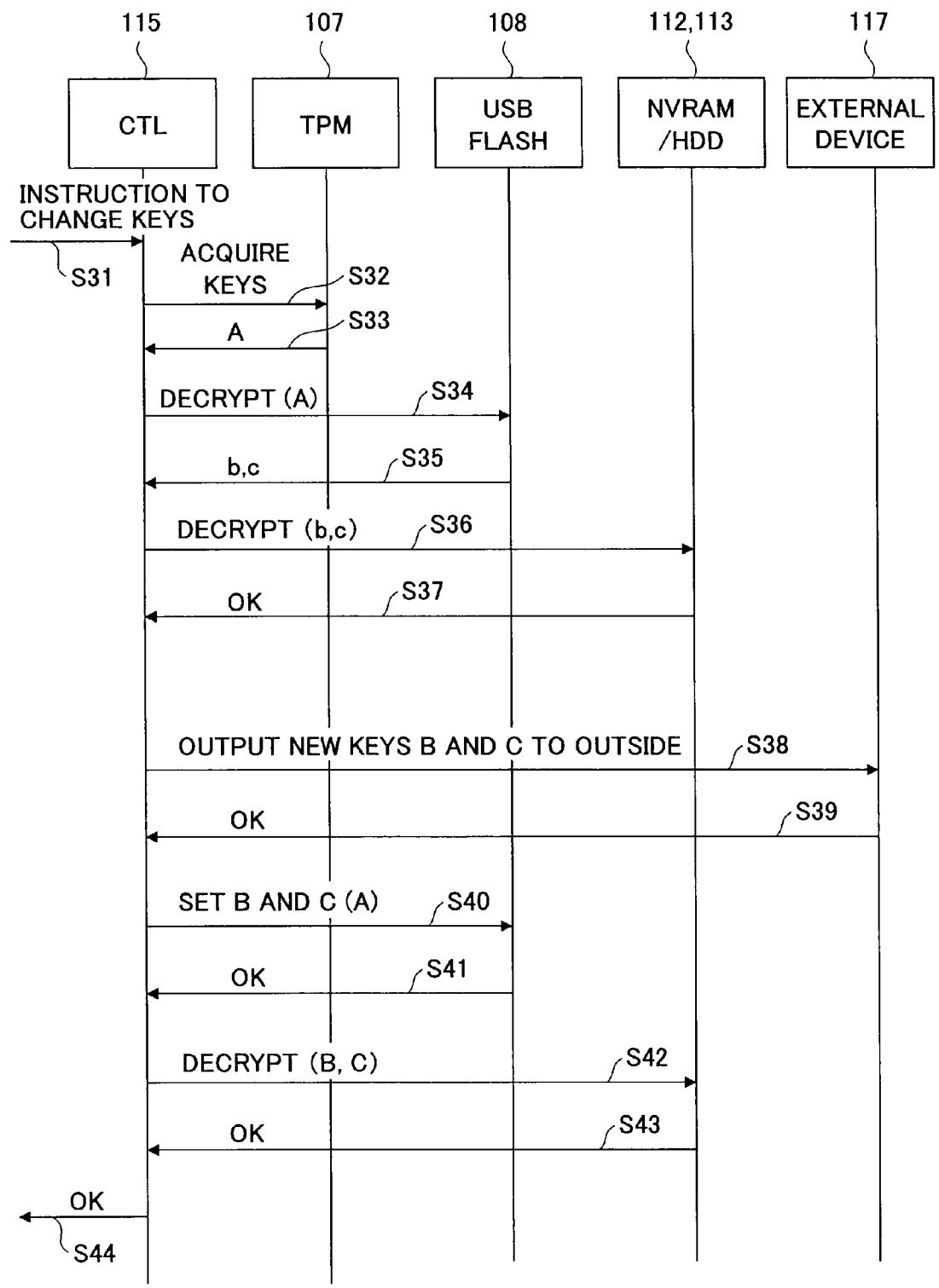
FIG. 8 shows a sequence chart of an encryption key setting sequence in the case of successful output of new encryption keys.

FIG. 8 shows a sequence chart of an encryption key setting sequence upon successful output of the new encryption keys B and C to the outside. In step S31, the CTL 115 receives a key change instruction (encryption keys b, c→encryption keys B, C) via the operating panel or a network. In steps S32 and S33, the CTL 115 acquires the encryption key A from the TPM 107.

In steps S34 and S35, the CTL 115 decrypts the encryption keys b and c stored in the USB flash memory 108 that are encrypted with the encryption key A, using the encryption key A, and acquires the decrypted encryption keys b and c from the USB flash memory 108. In steps S36 and S37, the CTL 115 decrypts the NVRAM 112 and the HDD 113 with the encryption keys b and c.

In steps S38 and S39, the CTL 115 outputs the new encryption keys B and C to an external device 117. Because the output of the encryption keys B and C has been successful, the CTL 115 in steps S40 and S41 encrypts the encryption keys B and C with the encryption key A and then saves the keys B and C in the USB flash memory 108.

In steps S42 and S43, the CTL 115 again encrypts the NVRAM 112 and the HDD 113 with the new encryption keys B and C. Because of the successful setting of the new encryption keys B and C, the CTL 115 causes an operating screen to be displayed on the operating panel and completes the setting of the encryption keys in step S44.

Figure 9:
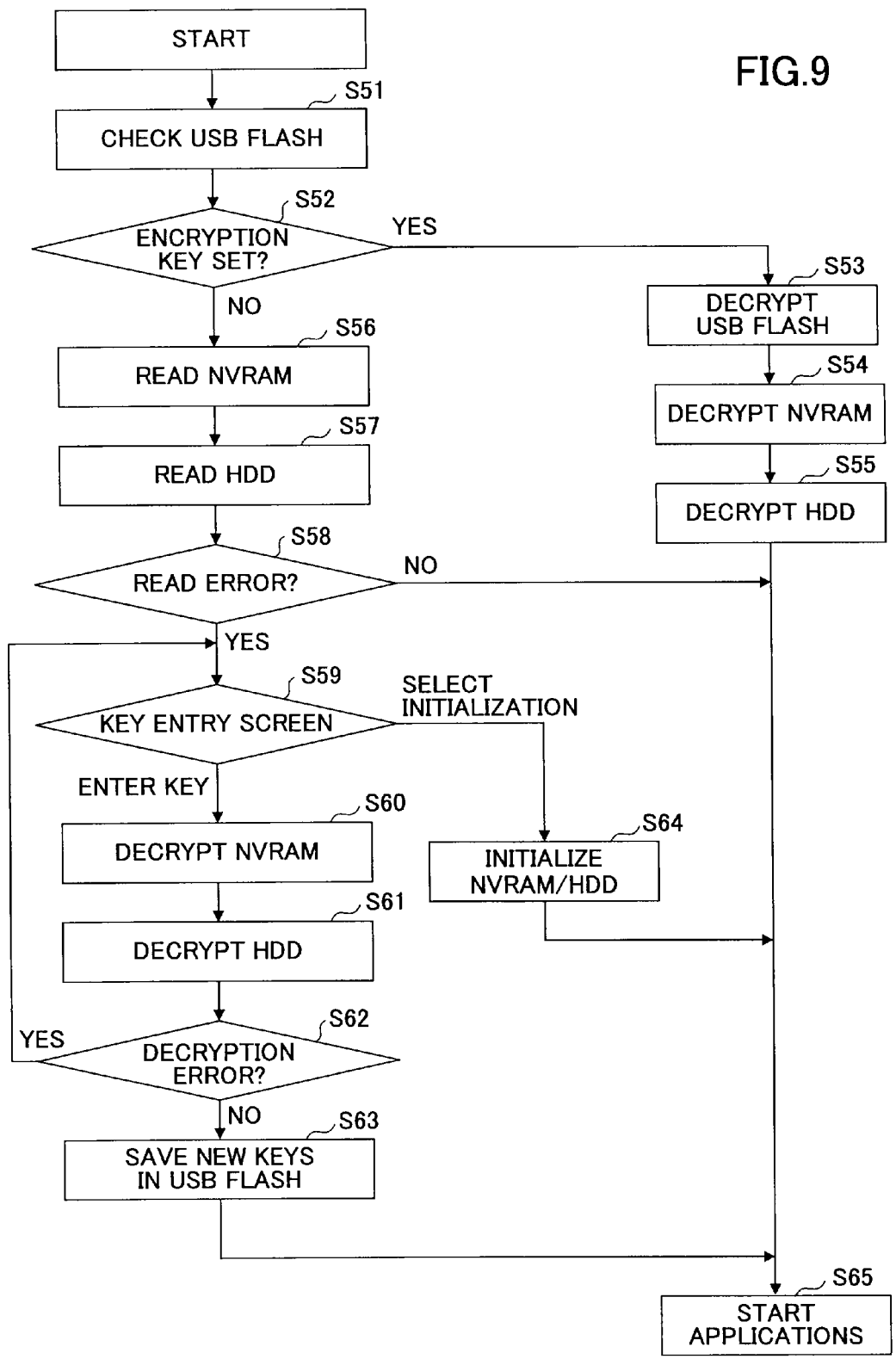
FIG. 9 shows a flowchart of a startup sequence of the multifunction peripheral of the embodiment of FIG. 6.
Figure 10:
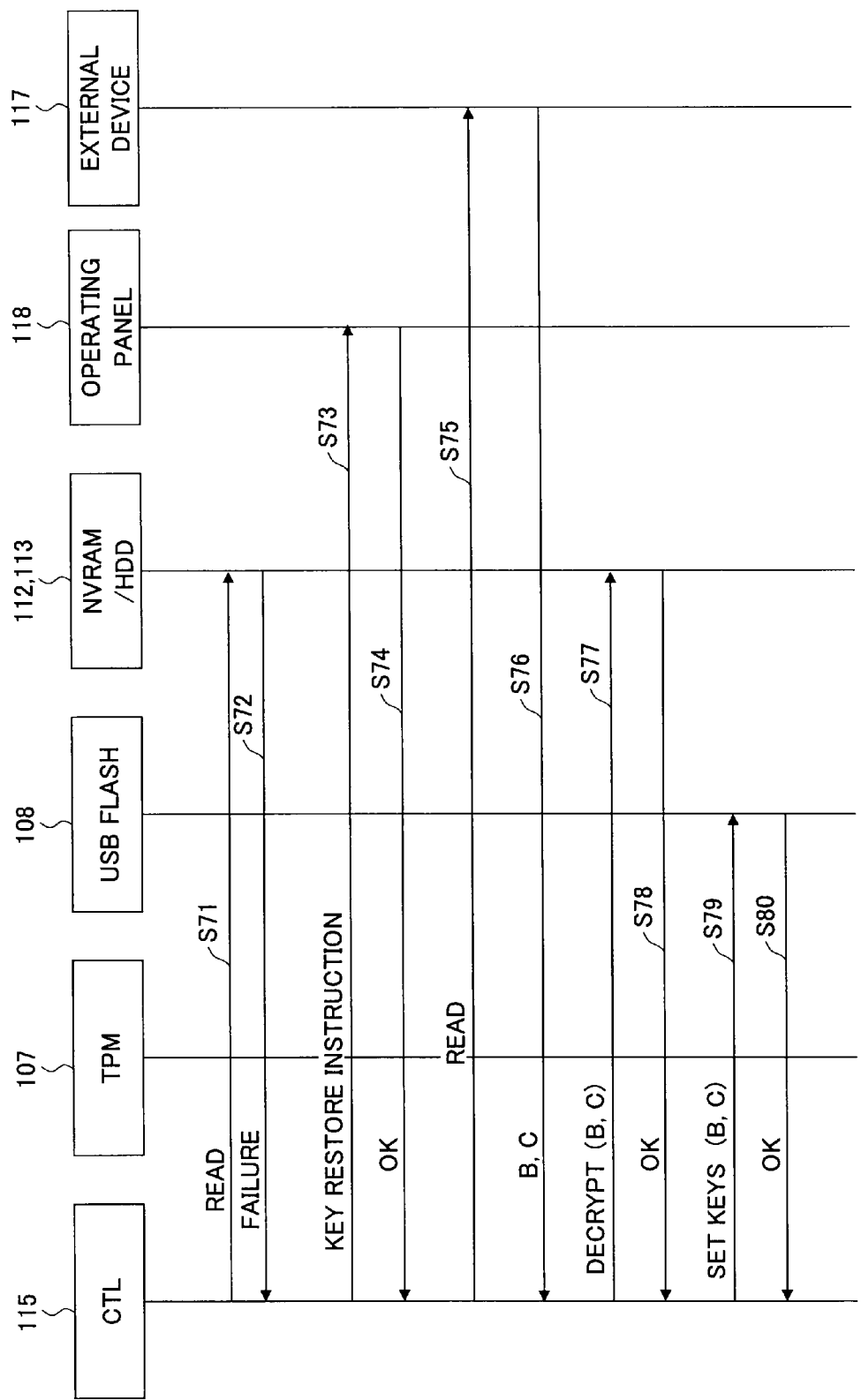
FIG. 10 shows a sequence chart of a startup sequence for the multifunction peripheral of FIG. 6 after replacement of the controller board.

FIG. 9 shows a flowchart of a startup sequence in the multifunction peripheral 100. FIG. 10 shows a sequence chart of a startup sequence of the multifunction peripheral after replacement of the controller board.

After the multifunction peripheral 100 is turned on, the CTL 115 acquires the encryption key A or A' from the TPM 107 and then determines whether an encryption key is set in the USB flash memory 108 in steps S51 and S52.

If an encryption key is set (YES in S52), the CTL 115 in step S53 decrypts the encryption keys B and C stored in the USB flash memory 108 that are encrypted with the encryption key A, using the encryption key A.

In step S54, the CTL 115 acquires the decrypted encryption key B from the USB flash memory 108, and decrypts the NVRAM 112 with the encryption key B. In step S55, the CTL 115 acquires the decrypted encryption key C from the USB flash memory 108 and decrypts the HDD 113 with it. In step S65, the multifunction peripheral 100 starts up each application using the application control software 116.

If no encryption keys are set (NO in S52), the CTL 115 determines that the NVRAM 112 and the HDD 113 are not encrypted. For example, after replacement of the controller board 101, no encryption key is set in the USB flash memory 108.

In step S56, the CTL 115 reads various parameters from the NVRAM 112 in plain text. In step S57, the CTL 115 reads data from the HDD 113 in plain text.

In step S58, the CTL 115 determines whether any read error has occurred during the reading of the various parameters from the NVRAM 112 and data from the HDD 113. A read error occurs if the parameters or data that are read from the NVRAM 112 or the HDD 113 in plain text are encrypted after replacement of the controller board 101. If no read error occurs (NO in S58), the CTL 115 in step S65 starts up each application using the application control software 116.

Figure 11:
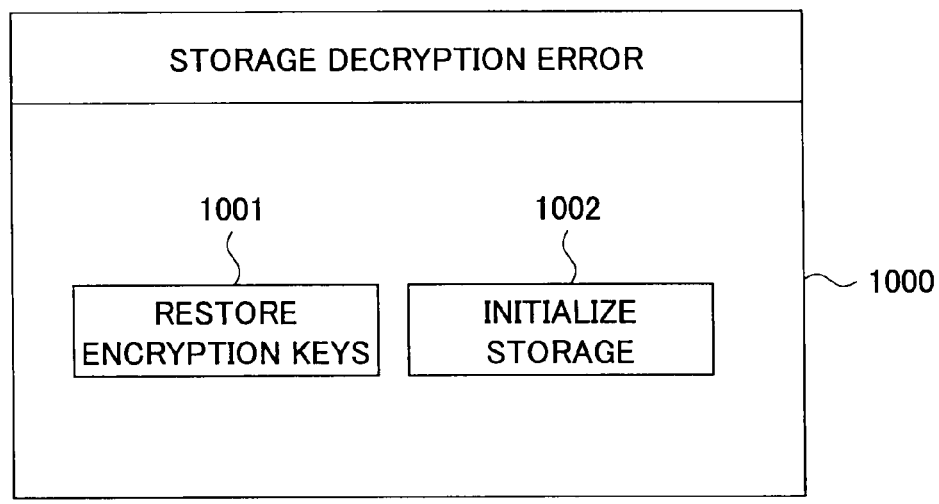
FIG. 11 shows an example of a screen prompting the selection of restoration of the encryption key or initialization of the storage device.

If a read error occurs (YES in S58), the CTL 115 in step S59 causes a screen 1000 to be displayed on the operating panel as shown in FIG. 11, which prompts the selection of either restoration of the encryption key or initialization of the storage device.

The screen 1000 includes a button 1001 for selecting restoration of the encryption key and a button 1002 for selecting initialization of the storage device. When the button 1001 is depressed by a user, the CTL 115 causes a screen 1100 to be displayed on the operating panel as shown in FIG. 12.

Figure 12:
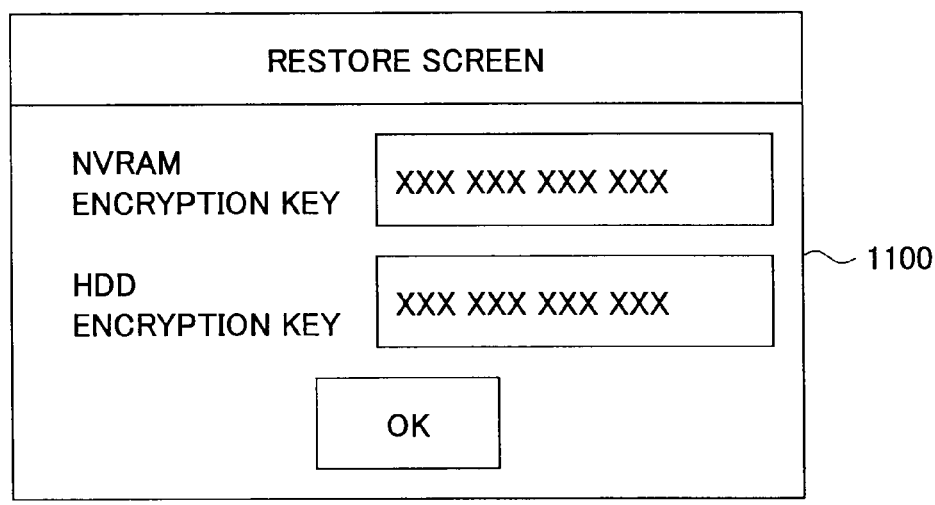
FIG. 12 shows an example of a screen for restoring encryption keys.

FIG. 12 shows an example of the screen for restoration of the encryption key. The screen 1100 shown in FIG. 12 includes entry boxes for entering encryption keys for the NVRAM 112 and the HDD 113. A user enters encryption keys for the NVRAM 112 and the HDD 113 from the outside either manually or using the external device 117 while the screen 1100 is displayed on the operating panel.

Upon entry of the encryption keys for the NVRAM 112 and the HDD 113 from the outside, the CTL 115 in steps S60 and S61 attempts to decrypt the NVRAM 112 and the HDD 113 with the entered encryption keys.

In step S62, if no decryption error develops (NO in S62), the CTL 115 in step S63 encrypts the encryption keys for the NVRAM 112 and the HDD 113 that have been entered on the screen 1100 as new encryption keys, with the encryption key A', and then stores the new keys in the USB flash memory 108. In step S65, the CTL 115 starts up each application using the application control software 116.

If a decryption error develops (YES in S62), the CTL 115 causes the screen 1000 to be displayed on the operating panel again back in step S59. If the button 1002 on the screen 1000 is depressed by the user, the CTL 115 in step S64 initializes the NVRAM 112 and the HDD 113. In step S65, the CTL 115 then starts up each application using the application control software 116.

In case of loss of the encryption keys that have been backed up or if the user did not back them up, the parameters and data that are stored encrypted in the NVRAM 112 and the HDD 113 cannot be decrypted. For this reason, the button 1002 for causing the user to select whether the NVRAM 112 and the HDD 113 should be initialized is provided on the screen 1000.

While the screen 1100 is adapted to the case where both the NVRAM 112 and the HDD 113 are encrypted, either one of them alone may be encrypted. In this case, the storage device that is not encrypted may not be included in the screen 1100. Furthermore, decryption of the storage device that is not encrypted may be skipped.

The sequence chart of FIG. 10 shows a startup sequence of the multifunction peripheral 100 in which the new encryption keys are restored after replacement of the controller board. After the multifunction peripheral 100 is turned on, the CTL 115 acquires the encryption key A' from the TPM 107 and determines whether an encryption key is set in the USB flash memory 108.

Because this is after replacement of the controller board 101, the USB flash memory 108 does not contain any encryption key that has been set. Therefore, the CTL 115 determines that the NVRAM 112 and the HDD 113 are not encrypted.

In step S71, the CTL 115 reads various parameters and data from the NVRAM 112 and the HDD 113 in plain text. Because the parameters and data stored in the NVRAM 112 and the HDD 113 are encrypted after replacement of the controller board 101, a read error develops if they are read out in plain text.

In response to the read error, the CTL 115 in steps S73 and S74 causes the screen 1000 shown in FIG. 11 to be displayed on the operating panel 118, prompting the selection of either restoration of the encryption key or initialization of the storage device. As the button 1001 is depressed by the user, the CTL 115 in steps S75 and S76 reads the encryption keys B and C from the external device 117 where they are backed up. Alternatively, the CTL 115 may cause the screen 1100 of FIG. 12 to be displayed on the operating panel 118 to prompt the entry of encryption keys for the NVRAM 112 and the HDD 113.

In steps S77 and S78, attempts are made to decrypt the NVRAM 112 and the HDD 113 with the encryption keys B and C read from the external device 117. Because no decryption error develops, the CTL 115 in steps S79 and S80 stores the encryption keys B and C read from the external device 117 as new encryption keys in the USB flash memory 108 after encrypting them with the encryption key A'. The CTL 115 then starts up each application using the application control software 116.

Embodiment 2

Figure 13:
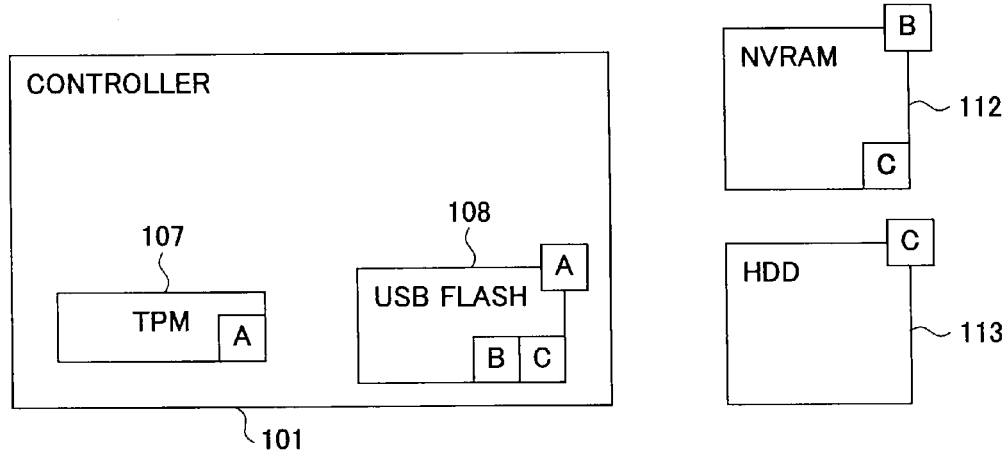
FIG. 13 shows a conceptual diagram of a location of storage of encryption keys according to another embodiment of the invention.

While it has been described above that the encryption keys B and C are stored in the USB flash memory 108 as encrypted with the encryption key A, another embodiment as shown in FIG. 13 may be employed. FIG. 13 shows a conceptual diagram illustrating the location of storage of the encryption keys. In the example shown in FIG. 13, an encryption key C for the HDD 113 that has been encrypted with the encryption key B is stored in the NVRAM 112.

Thus, in the multifunction peripheral 100 of the present embodiment, it is possible to store an encryption key for one of plural storage devices in another one of the storage devices that is secure and the most reliable, in an encrypted manner. By storing the encryption key C in the NVRAM 112 for the HDD 113 encrypted with the encryption key B, the need for backing up the encryption key C in the multifunction peripheral 100 can be eliminated.

While FIG. 13 shows the multifunction peripheral 100 in which the encryption key C for the HDD 113 is stored also in the USB flash memory 108 on the controller board 101, the HDD 113 can be recovered during normal operation or upon replacement of the controller board 101 without the encryption key C being stored in the USB flash memory 108. However, by storing the encryption key C within the USB flash memory 108, an advantage can be obtained that the multifunction peripheral 100 can recover the HDD 113 in the event that there is no abnormality in the controller board 101 but there is an abnormality in the NVRAM 112.

Figure 14:
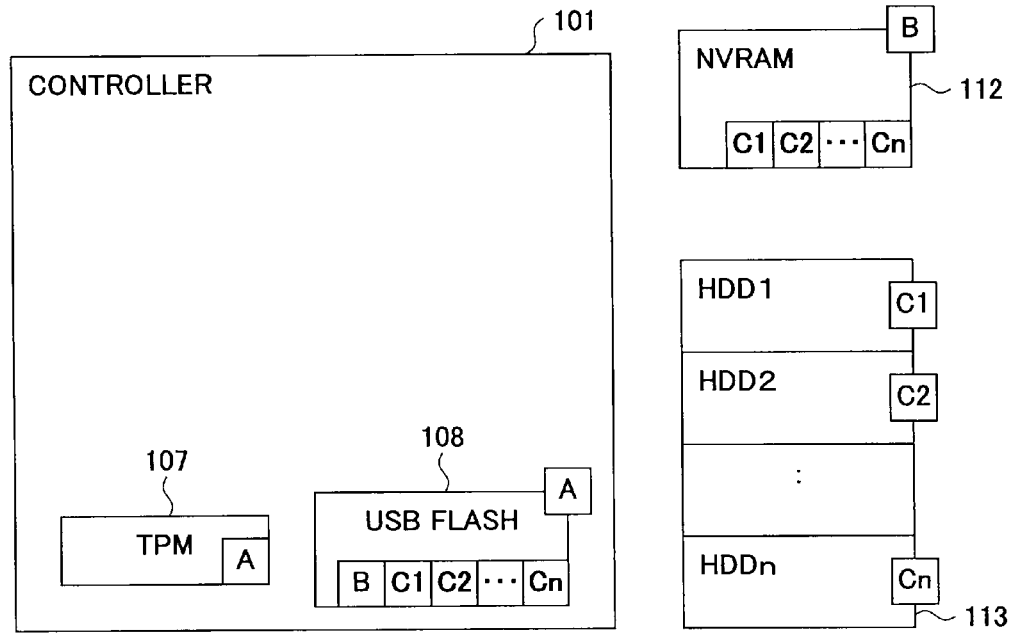
FIG. 14 shows a conceptual diagram of another example of the location of storage of the encryption keys.

FIG. 14 shows a conceptual diagram illustrating another example of the location of storage of the encryption key. In the example of FIG. 14, the HDD 113 has plural partitions of storage regions, where each partition is encrypted with a different encryption key C1-Cn. The HDD 113 may be encrypted with encryption keys C1-Cn allocated to each of plural users. In the multifunction peripheral 100, the encryption keys C1-Cn for the HDD 113 are stored in the NVRAM 112 as encrypted with the encryption key B.

Figure 15:
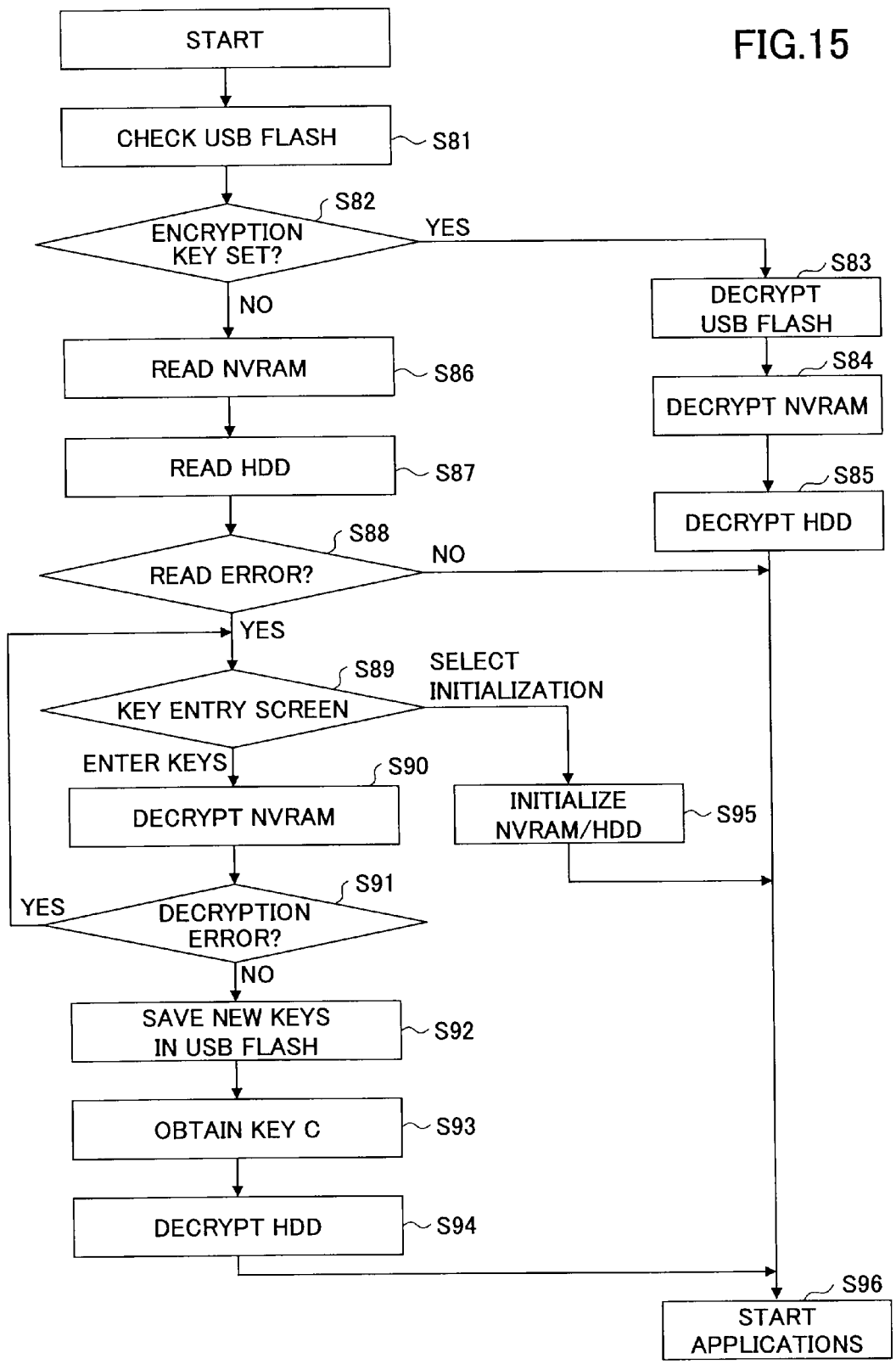
FIG. 15 shows a flowchart of a startup sequence of the multifunction peripheral of the embodiment of FIG. 13.

The multifunction peripheral 100 in which the encryption key C is stored as shown in FIG. 13 is started up in accordance with a flowchart shown in FIG. 15.

After the multifunction peripheral 100 is turned on, the CTL 115 acquires the encryption key A or A' from the TPM 107 and then determines in steps S81 and S82 whether an encryption key is set in the USB flash memory 108.

If an encryption key is set (YES in S82), the CTL 115 in step S83 decrypts the encryption keys B and C stored in the USB flash memory 108 that are encrypted with the encryption key A, using the encryption key A.

In step S84, the CTL 115 acquires the decrypted encryption key B from the USB flash memory 108, and decrypts the NVRAM 112 with the encryption key B. In step S85, the CTL 115 acquires the decrypted encryption key C from the USB flash memory 108 and decrypts the HDD 113. In step S96, the multifunction peripheral 100 starts up each application using the application control software 116.

If the encryption key is not set (NO in S82), the CTL 115 determines that the NVRAM 112 and the HDD 113 are not encrypted. No encryption key is set in the USB flash memory 108 after replacement of the controller board 101, for example.

In step S86, the CTL 115 reads various parameters from the NVRAM 112 in plain text. In step S87, the CTL 115 reads data from the HDD 113 in plain text.

In step S88, the CTL 115 determines whether a read error has occurred during the reading of the various parameter from the NVRAM 112 or data from the HDD 113. A read error occurs when, for example, the parameters and data that are read from the NVRAM 112 and the HDD 113 in plain text are encrypted after replacement of the controller board 101. If no read error occurs (NO in S88), the CTL 115 in step S96 starts up each application using the application control software 116.

In the event of a read error (YES in S88), the CTL 115 in step S89 causes the screen 1000 shown in FIG. 11 to be displayed on the operating panel for the selection of either restoration of the encryption key or initialization of the storage device. Upon selection of restoration of the encryption key, the CTL 115 in step S90 attempts to decrypt the NVRAM 112 with an encryption key for the NVRAM 112 that is externally entered.

If no decryption error occurs in step S91, the CTL 115 in step S92 encrypts, with the encryption key A', the encryption key for the NVRAM 112 that has been entered on the screen 1100 as a new encryption key, and then stores it in the USB flash memory 108.

In step S93, the CTL 115 obtains the encryption key C for the HDD 113 from the NVRAM 112. In step S94, the CTL 115 decrypts the HDD 113 with the encryption key C. After encrypting the encryption key C as a new encryption key for the HDD 113 with the encryption key A', the CTL 115 stores the encrypted encryption key C in the USB flash memory 108. In step S96, the CTL 115 starts up each application using the application control software 116.

In the event of a decryption error (YES in S91), the CTL 115 causes the screen 1000 to be displayed on the operating panel again back in step S89. Upon selection of initialization of the storage device, the CTL 115 in step S95 initializes the NVRAM 112 and the HDD 113. In step S96, the CTL 115 then starts up each application using the application control software 116.

Figure 16:
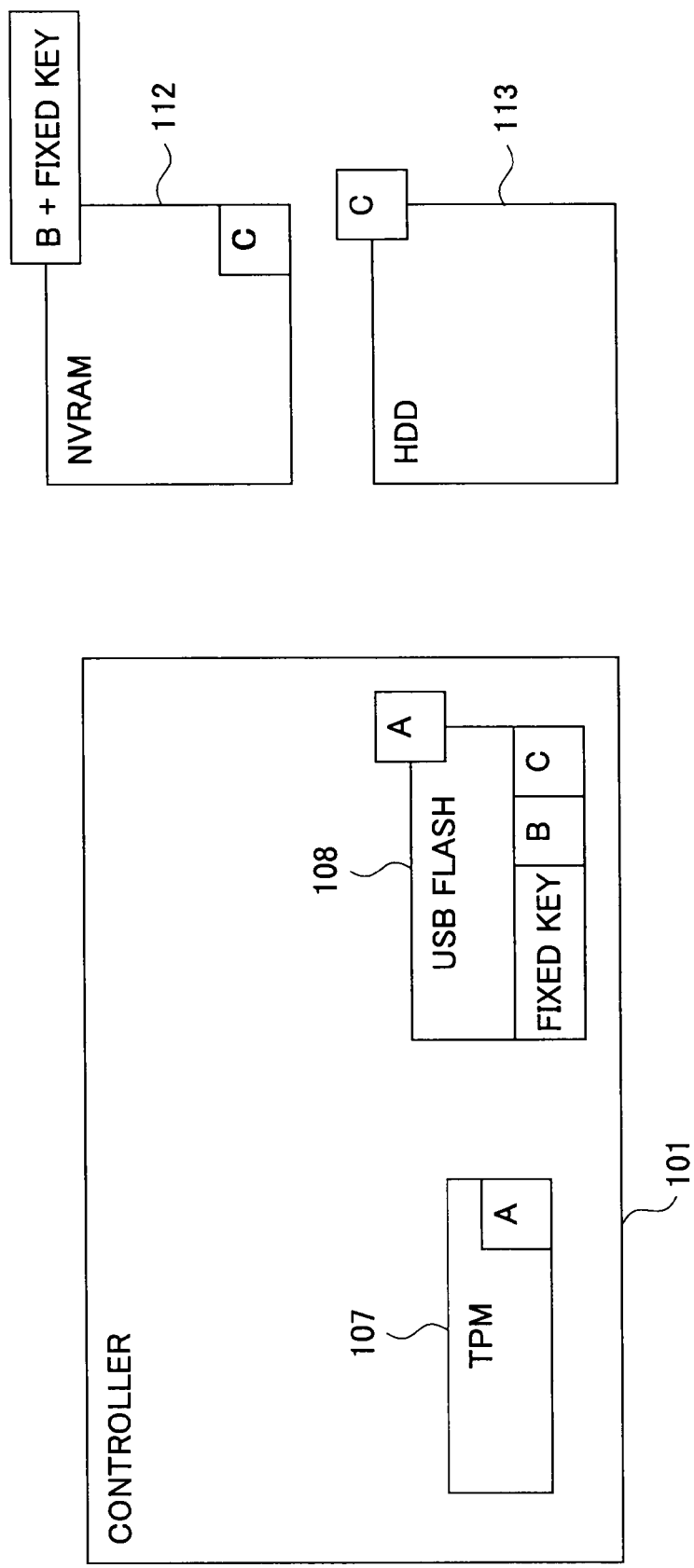
FIG. 16 shows a conceptual diagram of a configuration of encryption keys.

The encryption keys B and C may be configured as shown in a conceptual diagram of FIG. 16. In the example of FIG. 16, a fixed key that various types of devices can commonly use and the encryption key B are used for encrypting the NVRAM 112.

The fixed, common key for various types of devices is stored in the controller board 101 during the manufacturing process. By the use of the fixed key, the key length of the encryption key B can be reduced. For example, when the key length is 128 bits, the encryption key B may consist of 64 bits by allocating 64 bits as the device-common fixed value, whereby it is only necessary to enter 8 bytes (11 characters) upon restoration. By thus utilizing a fixed key common to different devices, decrypting the encryption key B in the event of its leakage requires the same type of controller board 101, thus increasing the cost of attack and making the key more secure.

Embodiment 3

Figure 17A:
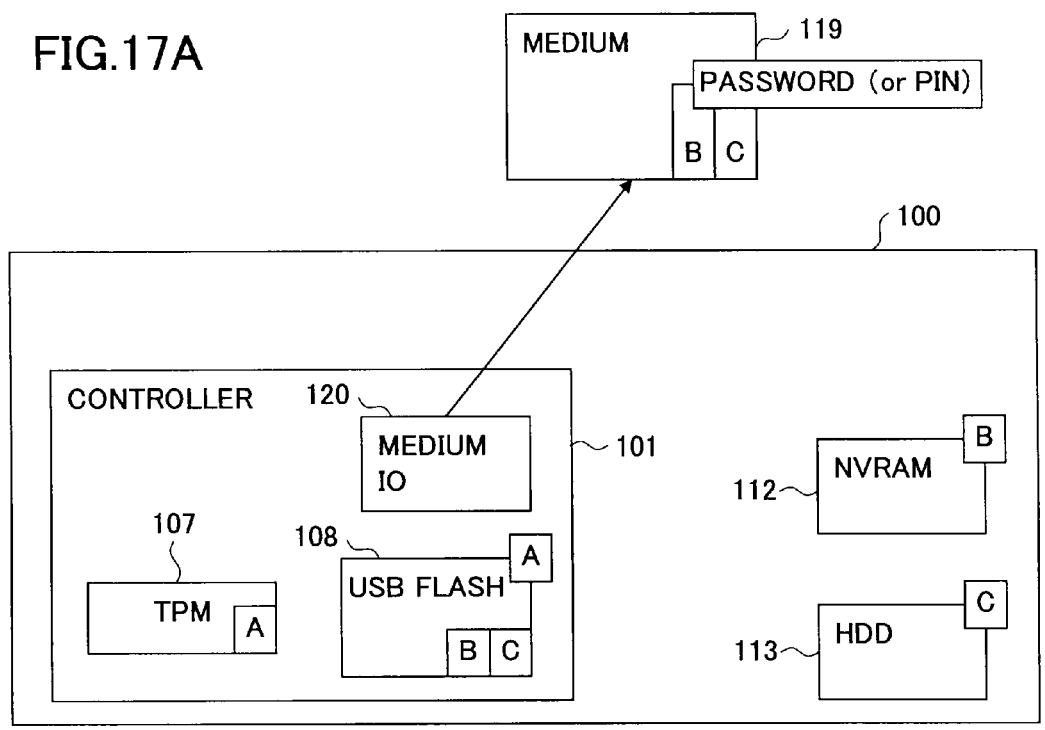
FIG. 17A shows the multifunction peripheral according to another embodiment of the invention before replacement of the controller board.
Figure 17B:
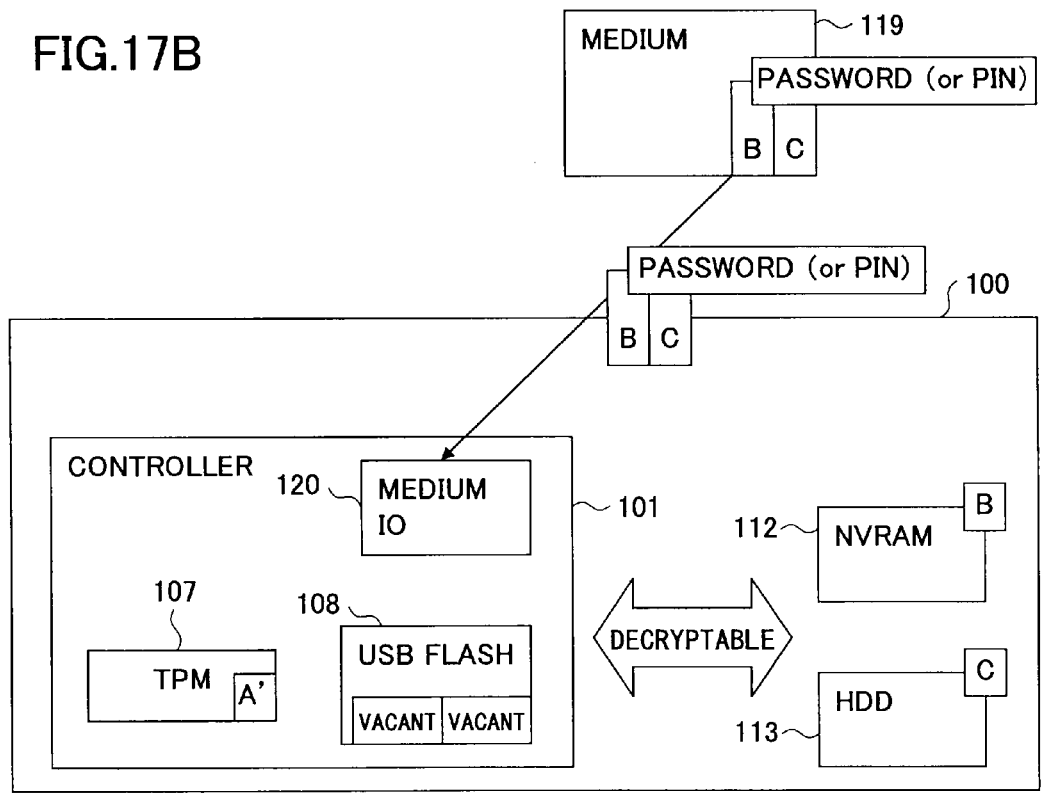
FIG. 17B shows the multifunction peripheral of FIG. 17A after replacement of the controller board.

FIGS. 17A and 17B show conceptual diagrams illustrating a data recovery method according to another embodiment. FIG. 17A shows the multifunction peripheral 100 prior to replacement of the controller board 101. FIG. 17B shows the multifunction peripheral 100 after replacement of the controller board 101.

In the multifunction peripheral 100, the encryption keys B and C that are stored in the USB flash memory 108 are saved in an external medium 119, which may be an SD card or a USB memory, while the controller board 101 is normally operating. When storing the encryption keys B and C, the multifunction peripheral 100 asks the user to enter restoration passwords for the encryption keys B and C and encrypts the encryption keys B and C with them.

After replacement of the controller board 101, the multifunction peripheral 100 restores the encryption keys B and C saved in the external medium 119 by decrypting them with their restoration passwords entered by the user. While FIG. 17 shows the multifunction peripheral 100 having the encryption keys B and C stored in the external medium 119, it may utilize an external server instead of the external medium 119.

Thus, by encrypting the encryption keys B and C that are backed up in the multifunction peripheral 100, the keys can be made more difficult to compromise in the event they are stolen.

Embodiment 4

Figure 18A:
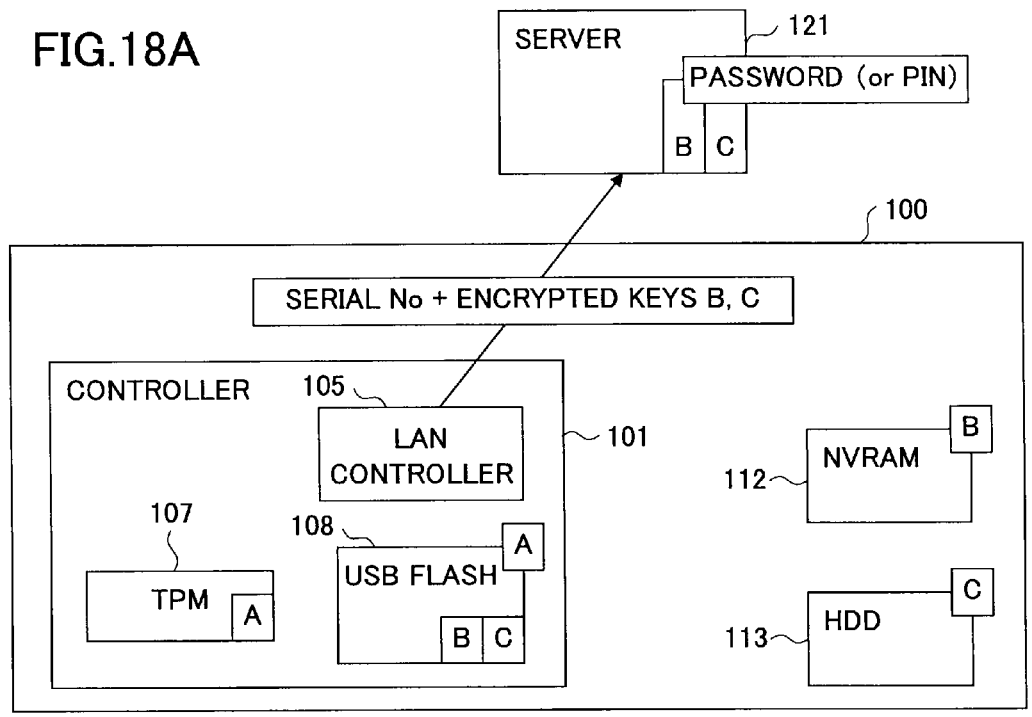
FIG. 18A shows the multifunction peripheral according to another embodiment of the invention before replacement of the controller board.
Figure 18B:
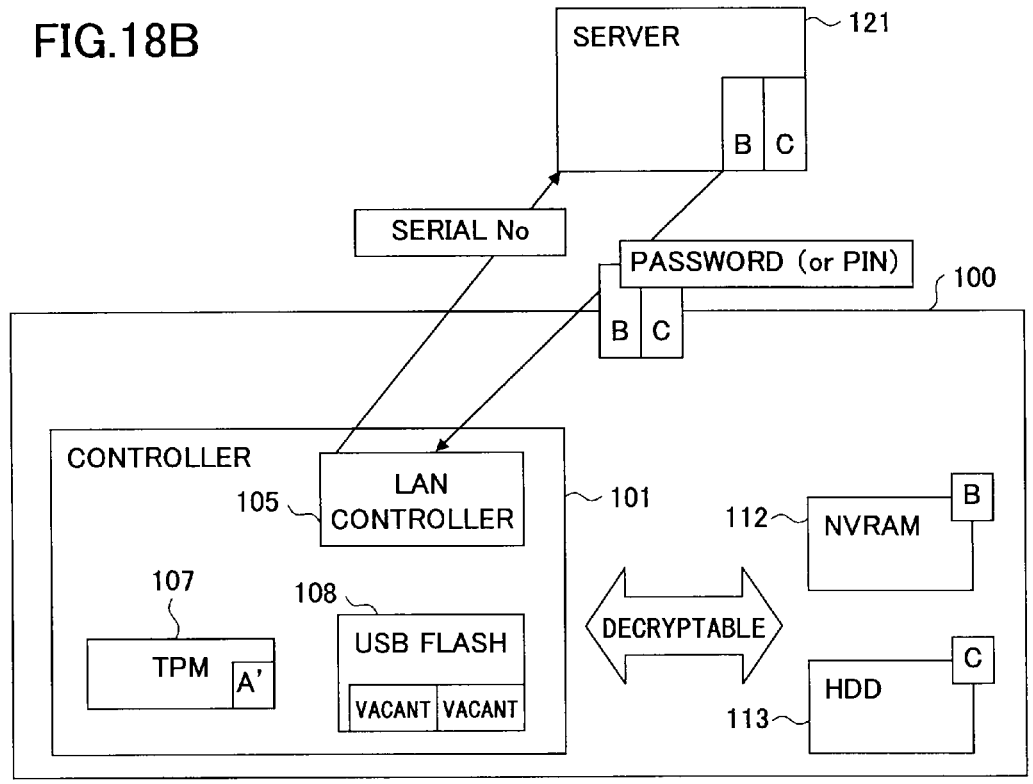
FIG. 18B shows the multifunction peripheral of FIG. 18A after replacement of the controller board.

FIGS. 18A and 18B show conceptual diagrams illustrating a data recovery method according to another embodiment. FIG. 18A shows the multifunction peripheral 100 prior to replacement of the controller board 101. FIG. 18B shows the multifunction peripheral 100 after replacement of the controller board 101.

In the multifunction peripheral 100 of the present embodiment, the encryption keys B and C that are stored in the USB flash memory 108 are saved in an external server 121 while the controller board 101 is normally operating. When storing the encryption keys B and C, the multifunction peripheral 100 asks the user to enter restoration passwords for the encryption keys B and C and encrypts the encryption keys B and C with them. The multifunction peripheral 100 also transmit a serial number of the controller board 101 to the external server 121.

The serial number of the controller board 101 is stored in a nonvolatile memory on the controller board 101 upon shipping from factory and is also printed on the controller board 101.

Alternatively, the serial number of the controller board 101 may be stored in an RFID tag or an IC card chip. The serial number of the controller board 101 needs to be legible even when the controller board 101 is broken, which is when the controller board 101 is replaced. By storing the serial number of the controller board 101 in an IC card chip, alteration of the number can also be prevented.

The external server 121 has a server table shown in FIG. 19 with which it manages the serial number of the controller board 101 in association with the encryption keys B and C encrypted with passwords. FIG. 19 is an example of the server table.

After replacement of the controller board 101, the multifunction peripheral 100 restores the encryption keys B and C saved in the external server 121 by having an administrator, for example, enter the serial number printed on the controller board 101 that is being replaced and the address of the external server 121.

Upon entry of the serial number printed on the controller board 101 being replaced and the address of the external server 121, the multifunction peripheral 100 acquires the encrypted encryption keys B and C that correspond to the serial number entered by the administrator, for example. The multifunction peripheral 100 then decrypts the encryption keys B and C with their restoration passwords entered by the user.

While in the multifunction peripheral 100 shown in FIG. 18 the encryption keys B and C are stored in the external server 121, an external medium 119 may be utilized instead of the external server 121. By using a table similar to the server table shown in FIG. 19, the external medium 119 can store encrypted encryption keys B and C for plural multifunction peripherals 100.

The external server 121 may be a maintenance service server provided by the manufacturer. The address of the external server 121 may be stored in a nonvolatile memory on the controller board 101 during the manufacturing process.

Thus, in the multifunction peripheral 100, the back-up encryption keys B and C are collectively placed in the external server 121, thereby facilitating the maintenance of plural multifunction peripherals 100 or management of the encryption keys B and C.

Figure 20:
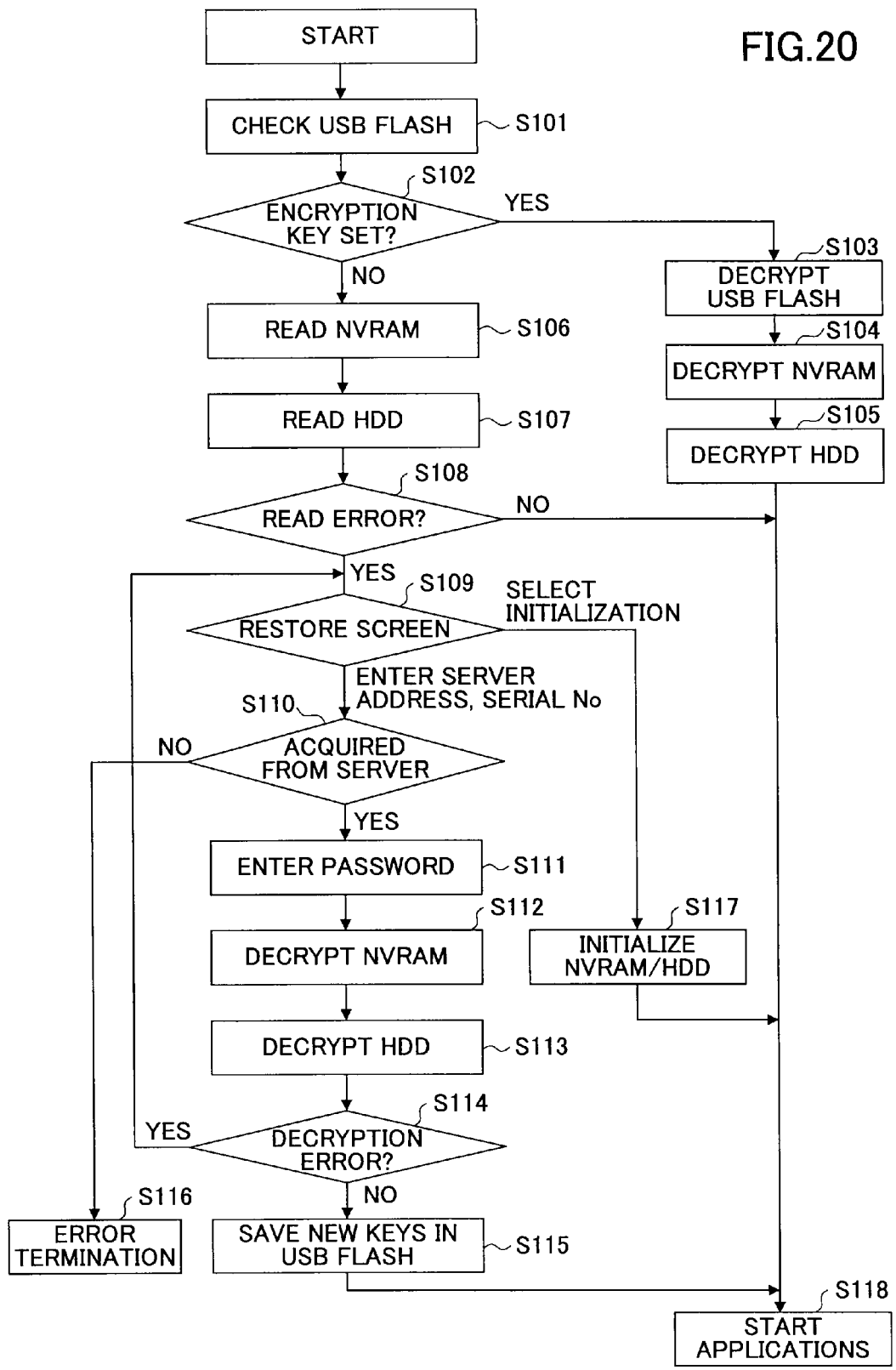
FIG. 20 shows a flowchart of a startup sequence of the multifunction peripheral of FIG. 18.

FIG. 20 shows a flowchart of a startup sequence of the multifunction peripheral 100. After the multifunction peripheral 100 is turned on, the CTL 115 in steps S101 and S102 acquires the encryption key A or A' from the TPM 107 and determines whether an encryption key is set in the USB flash memory 108.

If an encryption key is set (YES in S102), the CTL 115 in step S103 decrypts the encryption keys B and C stored in the USB flash memory 108 that are encrypted with the encryption key A, with the encryption key A.

In step S104, the CTL 115 acquires the decrypted encryption key B from the USB flash memory 108 and decrypts the NVRAM 112 with the encryption key B. In step S105, the CTL 115 acquires the decrypted encryption key C from the USB flash memory 108 and decrypts the HDD 113 with it. In step S118, the multifunction peripheral 100 starts up each application using the application control software 116.

If no encryption keys are set (NO in S102), the CTL 115 determines that the NVRAM 112 and the HDD 113 are not encrypted. No encryption key is set in the USB flash memory 108 after replacement of the controller board 101, for example.

In step S106, the CTL 115 reads various parameters from the NVRAM 112 in plain text. In step S107, the CTL 115 reads data from the HDD 113 in plain text.

In step S108, the CTL 115 reads various parameters from the NVRAM 112, and determines whether a read error has occurred during the reading of data from the HDD 113. A read error occurs when, for example, the parameters and data that are read in plain text are encrypted in the NVRAM 112 and the HDD 113 after replacement of the controller board 101.

If no read error occurs (NO in S108), the CTL 115 in step S118 starts up each application using the application control software 116.

If a read error occurs (YES in S108), the CTL 115 in step S109 causes the screen 1000 of FIG. 11 to be displayed on the operating panel, prompting the user to select either restoration of the encryption key or initialization of the storage device. Upon selection of restoration of the encryption key, the CTL 115 causes a screen to be displayed on the operating panel 118 prompting the administrator, for example, to enter the serial number printed on the controller board 101 being replaced and the address of the external server 121.

In step S110, the CTL 115 determines whether the encrypted encryption keys B and C that correspond to the serial number entered by the administrator have been acquired from the external server 121. Upon acquisition of the encrypted encryption keys B and C from the external server 121 (YES in S110), the CTL 115 in step S111 prompts the user to enter the restoration passwords for the encryption keys B and C. With the restoration passwords for the encryption keys B and C, the CTL 115 decrypts the encryption keys B and C.

In step S112, the CTL 115 attempts to decrypt the NVRAM 112 with the decrypted encryption key B. In step S113, the CTL 115 attempts to decrypt the HDD 113 with the decrypted encryption key C.

In step S114, if no decryption error occurs (NO in S114), the CTL 115 in step S115 encrypts, with the encryption key A', the encryption keys B and C decrypted in step S111 as new encryption keys, and then stores the encrypted encryption keys B and C in the USB flash memory 108. In step S118, the CTL 115 starts up each application using the application control software 116.

If a decryption error occurs (YES in S114), the CTL 115 back in step S109 causes the screen 1000 to be displayed on the operating panel again. Upon selection of initialization of the storage device, the CTL 115 in step S117 initializes the NVRAM 112 and the HDD 113. The CTL 115 in step S118 starts up each application using the application control software 116. In the event of failure to acquire the encrypted encryption keys B and C from the external server 121 (NO in S110), the CTL 115 in step S116 ends the process with an error.

Embodiment 5

Figure 21A:
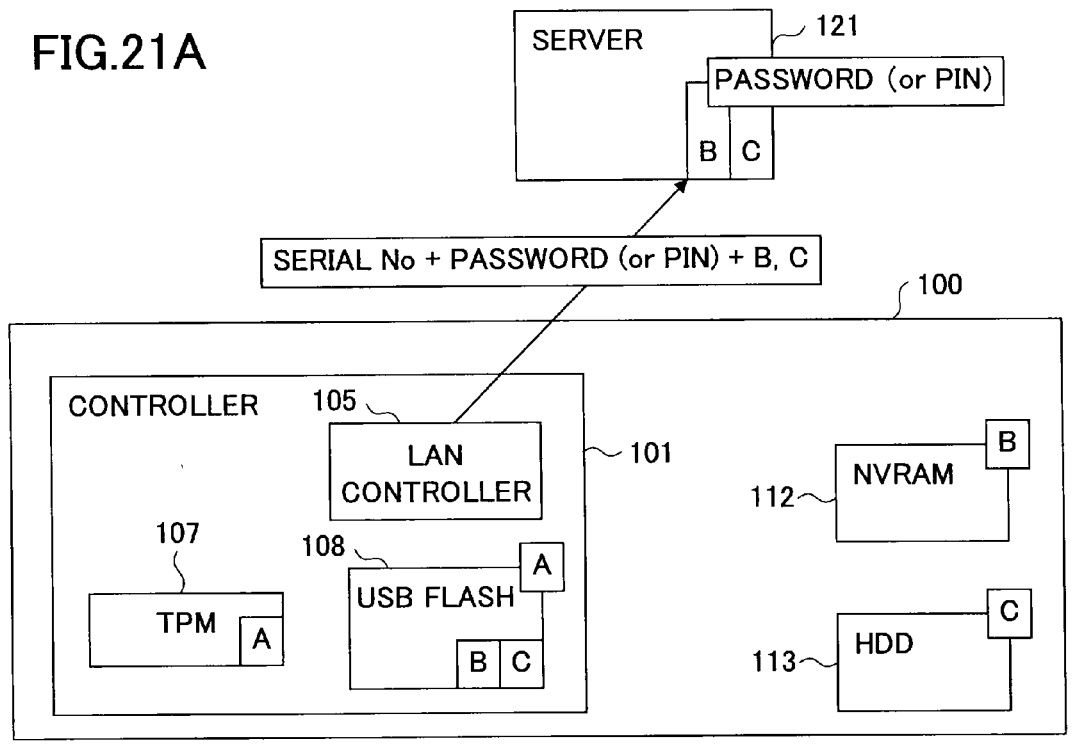
FIG. 21A shows a multifunction peripheral according to another embodiment of the present invention before replacement of the controller board.
Figure 21B:
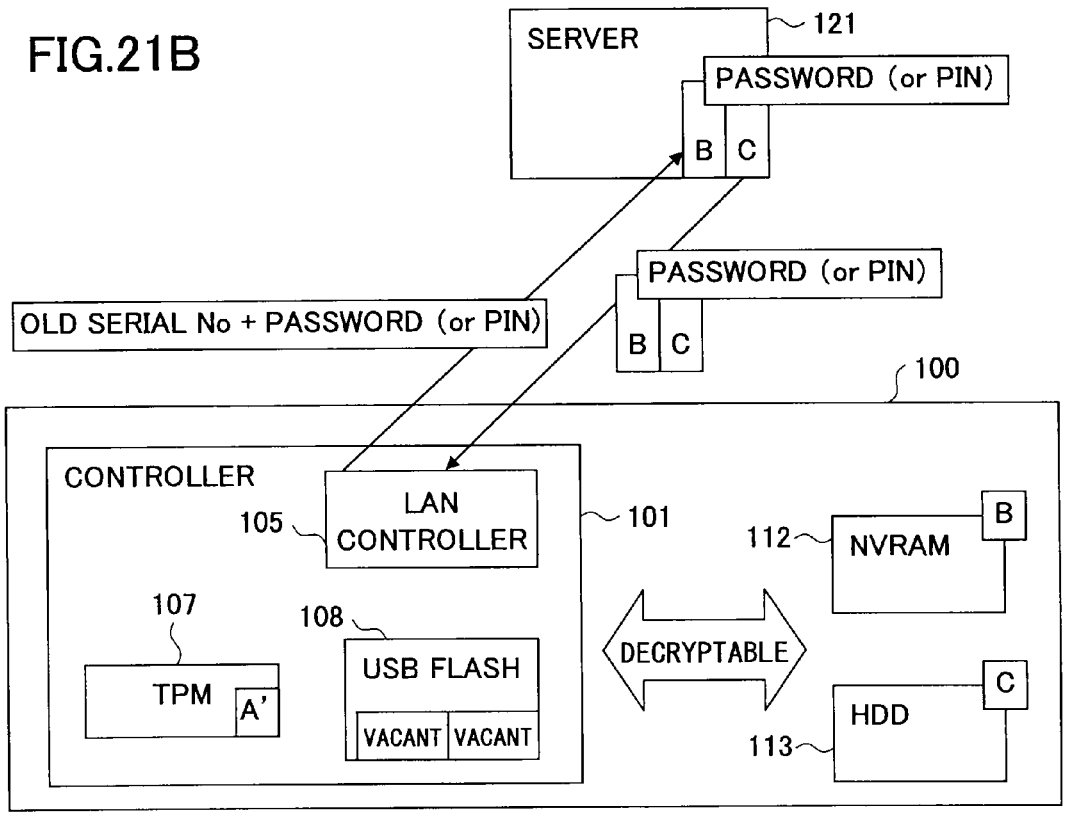
FIG. 21B shows the multifunction peripheral of FIG. 21A after replacement of the controller board.

FIGS. 21A and 21B show conceptual diagrams illustrating a data recovery method according to another embodiment. FIG. 21A shows the multifunction peripheral 100 prior to replacement of the controller board 101. FIG. 21B shows the multifunction peripheral 100 after replacement of the controller board 101.

In the multifunction peripheral 100 of the present embodiment, the encryption keys B and C stored in the USB flash memory 108 are saved in an external server 121 while the controller board 101 is normally operating. When storing the encryption keys B and C, the multifunction peripheral 100 prompts the user to enter restoration passwords for the encryption keys B and C and encrypts the encryption keys B and C with the passwords. The multifunction peripheral 100 also transmits the serial number of the controller board 101 to the external server 121. The external server 121 may be a maintenance service server provided by the manufacturer.

Upon receiving an encryption key restore request from the multifunction peripheral 100, the external server 121 authenticates the restore request. The external server 121 holds information for authenticating a restore request in a server table as shown in FIG. 22 by way of an example. In the server table shown in FIG. 22, the serial number of the controller board 101, the password with which encryption keys B and C are encrypted, and the encryption keys B and C encrypted with the password are managed in association with one another.

For example, in the external server 121 shown in FIG. 21, the passwords with which the encryption keys B and C are encrypted are used for authenticating the restore request. Alternatively, an independent authentication password different from the passwords used for encrypting the encryption keys B and C may be used for authenticating the restore request. Further alternatively, for authenticating the restore request, challenge-response authentication or hash authentication using an encryption key within the TPM 107 may be used. The external server 121 does not deliver the encrypted encryption keys B and C to the multifunction peripheral 100 whose restore request has not been successfully authenticated.

Upon successful authentication of the restore request, the external server 121 acquires the encrypted encryption keys B and C corresponding to the serial number of the controller board 101 received from the multifunction peripheral 100. The multifunction peripheral 100 then decrypts the encryption keys B and C using the restoration passwords for the encryption keys B and C entered by the user.

Thus, in the multifunction peripheral 100 of the present embodiment, authentication is performed upon restoration, so that an attack to compromise the encryption key, such as a brute-force attack or a dictionary attack can be detected.

Embodiment 6

Figure 23:
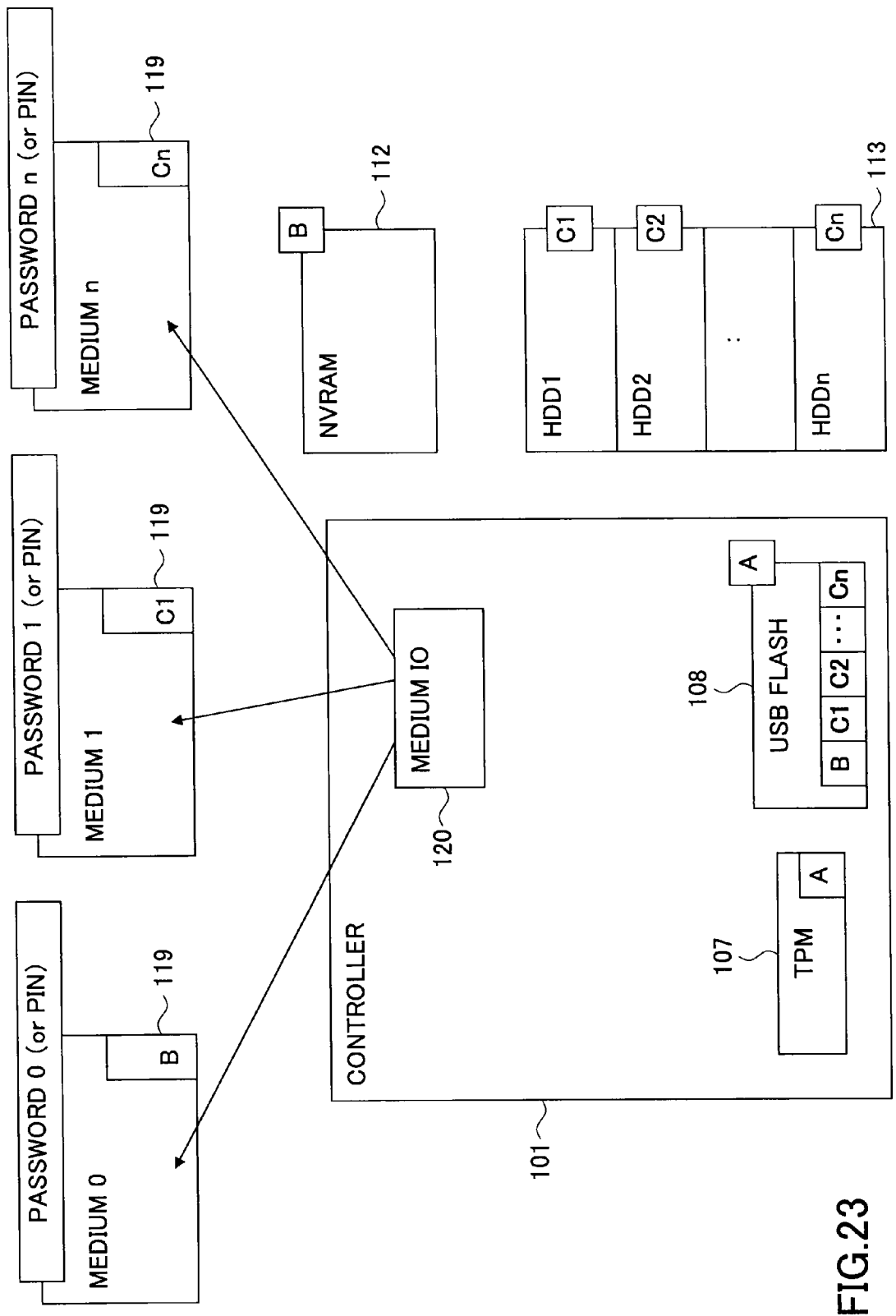
FIG. 23 shows a conceptual diagram illustrating a data recovery method according to another embodiment of the invention.

FIG. 23 shows a conceptual diagram illustrating a data recovery method according to another embodiment of the invention. In the embodiment shown in FIG. 23, which involves the multifunction peripheral 100 prior to replacement of the controller board 101, the storage unit of the HDD 113 is divided into plural partitions each of which is encrypted with different encryption keys C1-Cn. The HDD 113 may be allocated to plural users and encrypted with the different encryption keys C1-Cn.

In the multifunction peripheral 100 of the present embodiment, the encryption keys B and C1 to Cn stored in the USB flash memory 108 are saved in plural different external media 119 while the controller board 101 is normally operating. When storing the encryption keys B and C1 to Cn, the multifunction peripheral 100 prompts the user to enter restoration passwords 0 to n for the encryption keys B and C1 to Cn, and encrypts the encryption keys B and C1 to Cn with the passwords.

After replacement of the controller board 101, the multifunction peripheral 100 of the present embodiment restores the encryption keys B and C1 to Cn stored in the external media 119 by decrypting them using the restoration passwords 0 to n entered by the user. While the example of FIG. 23 involves plural external media 119, different directories in a single external medium 119 may be used.

Thus, in the multifunction peripheral 100 of the present embodiment, the encryption keys C1-Cn can be backed up for different users, so that even an administrator cannot analyze the users' encryption keys C1-Cn.

Embodiment 7

Figure 24:
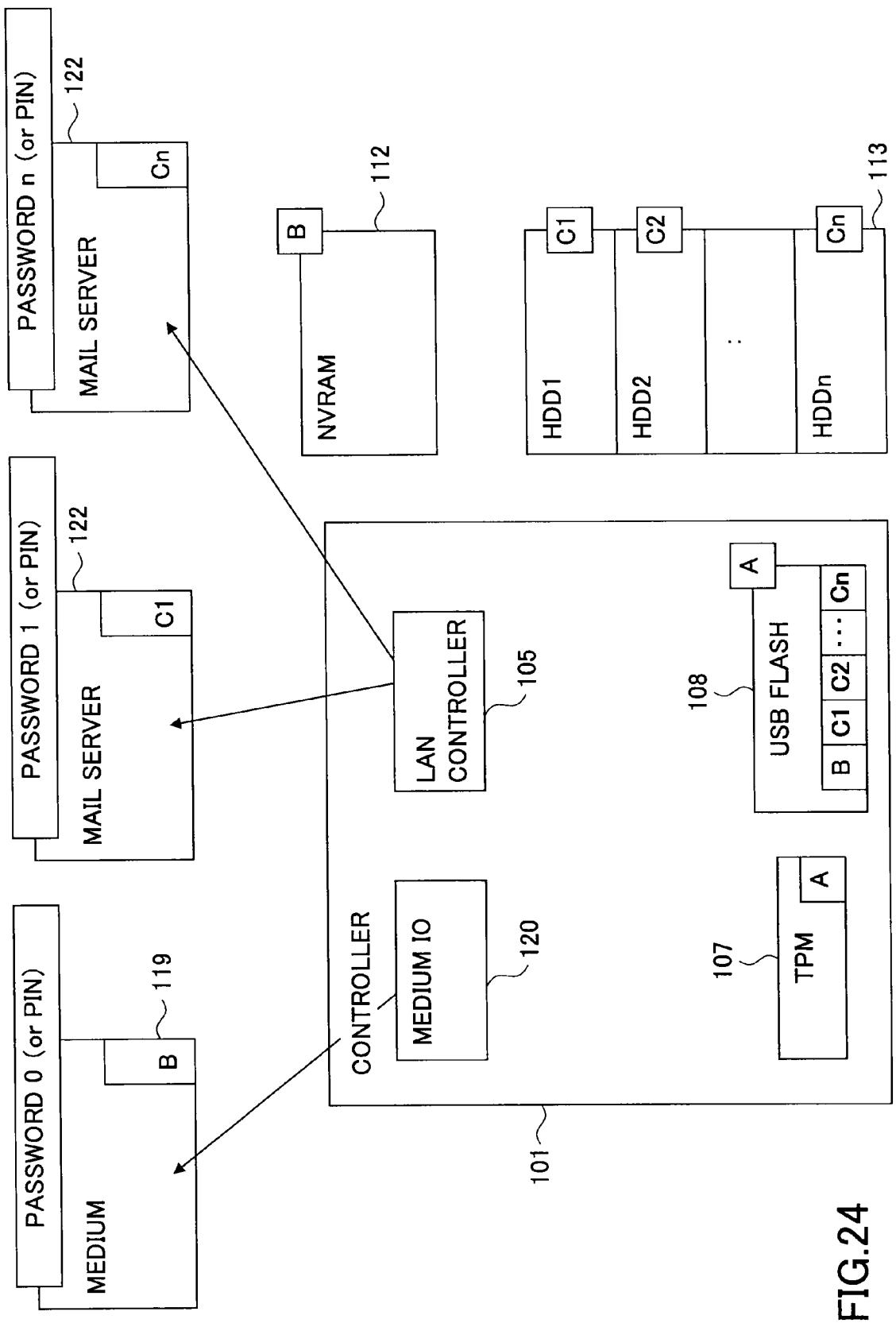
FIG. 24 shows a conceptual diagram illustrating a data recovery method according to another embodiment of the invention.

FIG. 24 shows a conceptual diagram illustrating a data recovery method according to another embodiment. In the example of FIG. 24, which involves the multifunction peripheral 100 prior to replacement of the controller board 101, the storage unit of the HDD 113 is divided into plural partitions each of which is encrypted with different encryption keys C1-Cn. Specifically, the HDD 113 is encrypted with encryption keys C1-Cn associated with plural different users.

In the multifunction peripheral 100 of the present embodiment, the encryption key B stored in the USB flash memory 108 is saved in a single external medium 119 while the controller board 101 is normally operating, and the encryption keys C1-Cn are transmitted to plural, different mail servers 122. When storing the encryption key B, the multifunction peripheral 100 prompts the user to enter a restoration password 0 for the encryption key B and encrypts the encryption key B with the password 0.

When transmitting the encryption keys C1-Cn, the multifunction peripheral 100 prompts the user to enter restoration passwords 1 to n for the encryption keys C1-Cn, and encrypts the encryption keys C1-Cn with the passwords 1 to n. The mail servers 122 then transfer the encrypted encryption keys C1-Cn to each user by mail.

FIG. 25 shows an example of mail transferred to a user. The encrypted encryption keys C1-Cn may be described in the mail text or attached to the mail in the form of an attached file.

After replacement of the controller board 101, the multifunction peripheral 100 of the present embodiment restores the encryption key B saved in the external medium 119 by decrypting the encryption key B using the restoration password 0 entered by the user. When restoring the encryption keys C1-Cn that have been mailed to each user, the multifunction peripheral 100 of the present embodiment acquires the encryption keys C1-Cn from mail received from a user and decrypts them with the restoration passwords 1 to n.

Thus, in the multifunction peripheral 100 of the present embodiment, the encryption keys C1-Cn can be mailed to each user, so that the individual users can save backups for the encryption keys C1-Cn.

Figure 26:
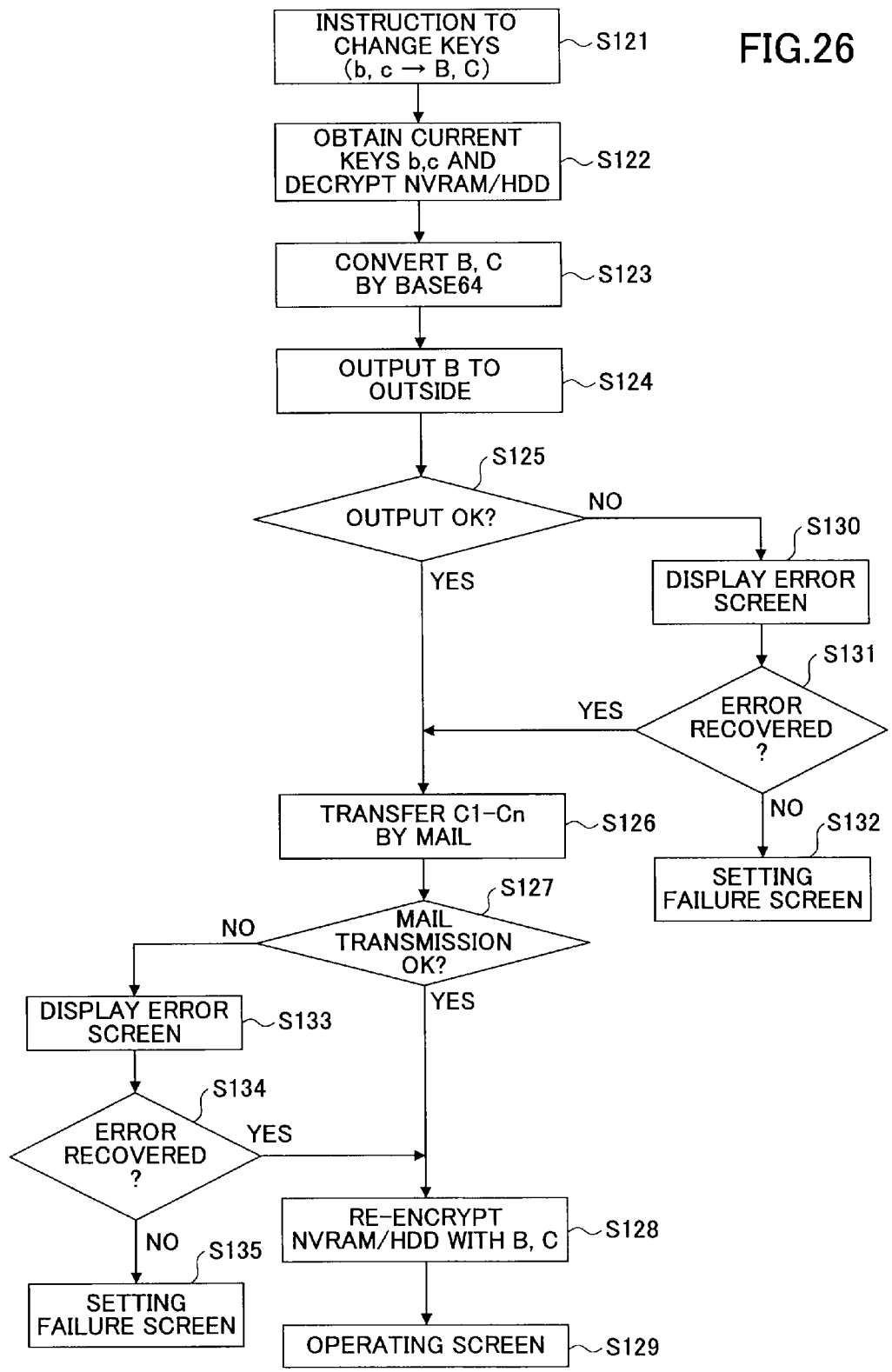
FIG. 26 shows a flowchart of an encryption key setting sequence for the multifunction peripheral of FIG. 24.

FIG. 26 shows a flowchart of an encryption key setting sequence of the multifunction peripheral according to the present embodiment. The CTL 115 in step S121 receives a key change instruction (encryption keys b, c→encryption keys B, C) via the operating panel or a network. The CTL 115 in step S122 acquires the encryption key A from the TPM 107. The CTL 115 then decrypts the encryption keys b and c stored in the USB flash memory 108 that are encrypted with the encryption key A, with the encryption key A. The CTL 115 then acquires the decrypted encryption keys b and c from the USB flash memory 108. The CTL 115 decrypts the NVRAM 112 with the encryption key b, and decrypts the HDD 113 with the encryption key c.

In step S123, the CTL 115 converts the encryption keys B and C by BASE64 encoding. In step S124, the CTL 115 outputs the new encryption key B to the outside via the operating panel or a network.

Upon successful output of the encryption key B to the outside in step S125 (YES in S125), the CTL 115 in step S126 transfers the encryption keys C1-Cn to the individual user by mail. Upon successful mail transmission of the encryption keys C1-Cn in step S127 (YES in S127), the CTL 115 in step S128 again encrypts the NVRAM 112 and the HDD 113 with the new encryption key B and encryption keys C1-Cn. Then, in step S129, the CTL 115 causes the operating screen to be displayed on the operating panel and completes the setting of the encryption key.

Should the output of the encryption key B to the outside fail (NO in S125) due to cancellation by the user or some other reason, an error screen is displayed on the operating panel in step S130. In step S131, the CTL 115 determines whether the error has been overcome. If not (NO in S131), the CTL 115 in step S132 causes an unsuccessful encryption key setting screen to be displayed on the operating panel. Upon recovery from the error (YES in S131), the CTL 115 proceeds to step S126.

If the mail transmission of the encryption keys C1-Cn fails (NO in S127), the CTL 115 in step S133 displays an error screen on the operating panel. In step S134, the CTL 115 determines whether the error has been overcome. If not (NO in S134), the CTL 115 in step S135 causes an unsuccessful encryption key setting screen to be displayed on the operating panel. Upon recovery from the error situation (YES in S134), the CTL 115 proceeds to step S128.

Figure 27:
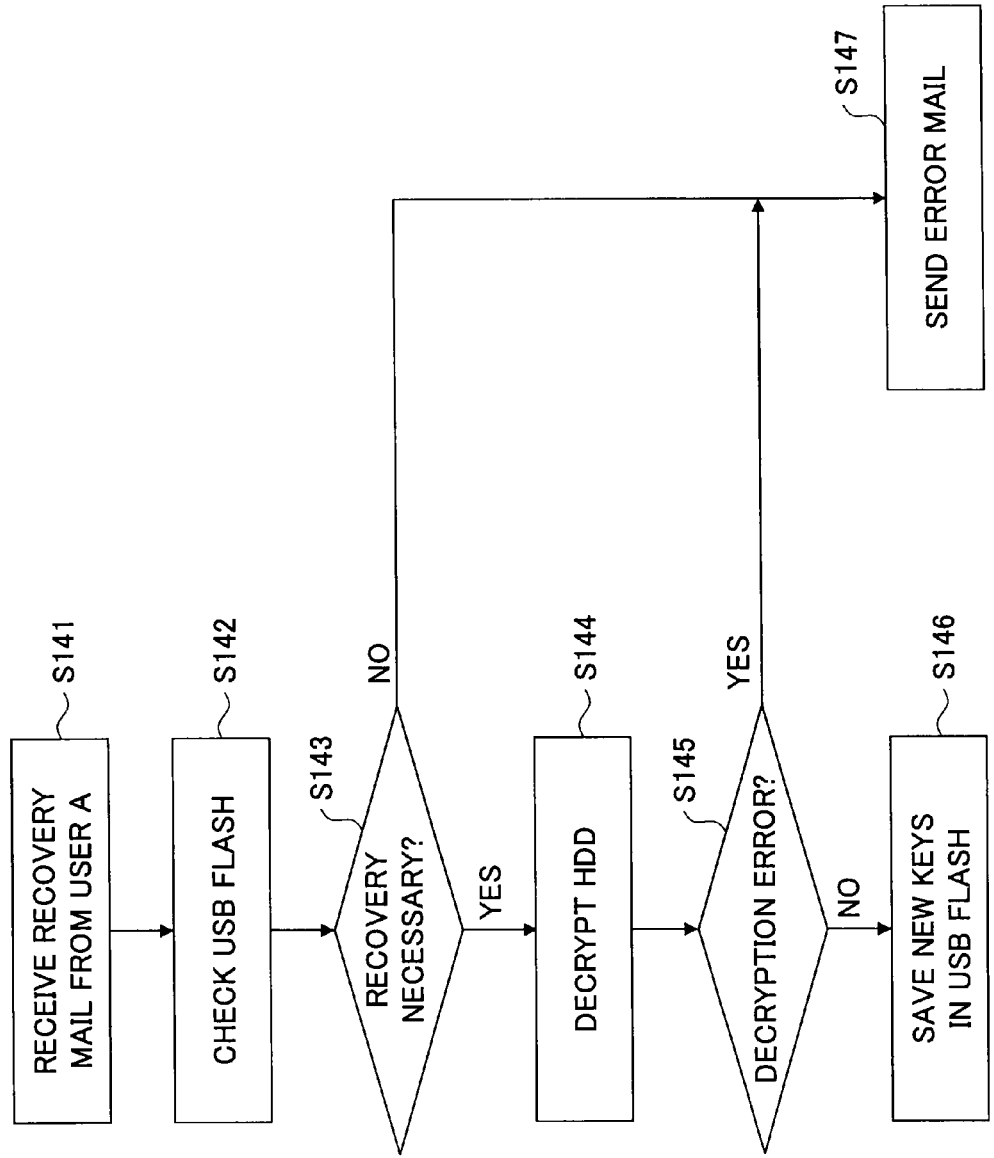
FIG. 27 shows a flowchart of a startup sequence of the multifunction peripheral of FIG. 24.

FIG. 27 shows a flowchart of a startup sequence of the multifunction peripheral 100. In step S141, a recovery mail is received from a user. In step S142, the CTL 115 checks the USB flash memory 108. If recovery of the encryption key is necessary (YES in S143), the CTL 115 in step S144 decrypts the HDD 113 using the encryption key acquired via the recovery mail. If no decryption error occurs (NO in S145), the CTL 15 saves the new key in the USB flash memory 108.

If no recovery of the encryption key is necessary (NO in S143), or a decryption error develops (YES in S145), the CTL 115 in step S147 transmits an error mail to the user.

Thus, in the multifunction peripheral 100 of the present embodiment, the parameters and data stored in the NVRAM 112 and the HDD 113 which are encrypted with the encryption keys B and C1 to Cn can be decrypted even after replacement of the controller board 101.

Embodiment 8

Figure 28:
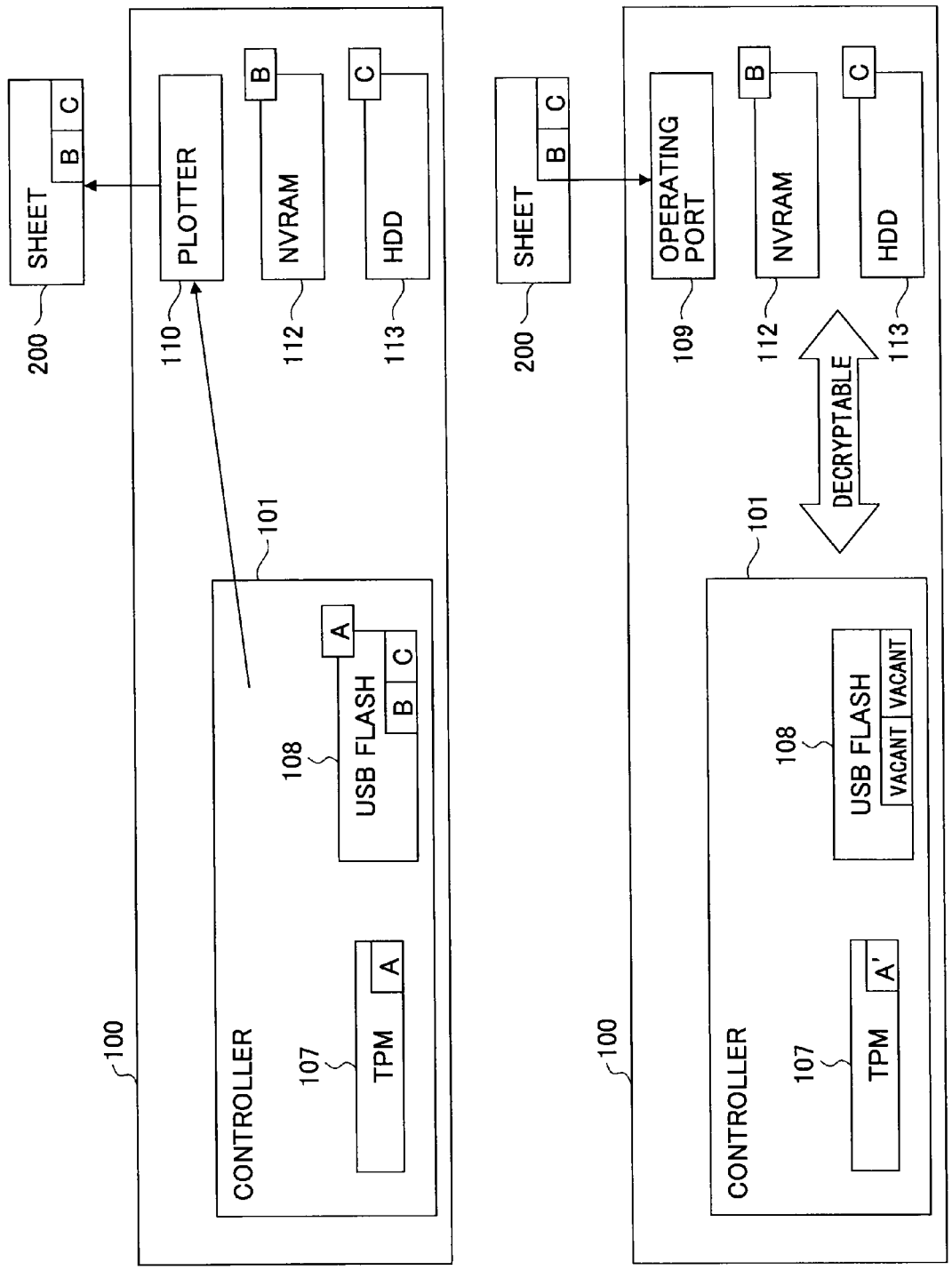
FIG. 28A shows a multifunction peripheral before replacement of the controller board according to another embodiment of the invention.
FIG. 28B shows the multifunction peripheral of FIG. 28A after replacement of the controller board.

FIGS. 28A and 28B show conceptual charts illustrating a data recovery method according to another embodiment. FIG. 28A shows the multifunction peripheral 100 prior to the replacement of the controller board 101. FIG. 28B shows the multifunction peripheral 100 after the replacement of the controller board 101.

In the multifunction peripheral 100 of the present embodiment, while the controller board 101 is normally operating, the encryption keys B and C stored in the USB flash memory 108 are printed on a sheet 200 by a plotter 110. Upon printing, the encryption keys B and C are converted into a printable data format such as BASE64 or Quoted-Printable.

After replacement of the controller board 101, the encryption keys B and C printed on the sheet 200 in printable data format such as BASE64 are entered via the operating panel and then decrypted, thereby restoring the encryption keys B and C in the USB flash memory 108.

Thus, in the multifunction peripheral 100 of the present embodiment, even after the replacement of the controller board 101, the parameters and data stored in the NVRAM 112 and the HDD 113 encrypted with the encryption keys B and C can be decrypted. Furthermore, in the multifunction peripheral 100, because the encryption keys B and C are backed up using the sheet 200, there is no need to provide a device for backing up the encryption keys.

Figure 29:
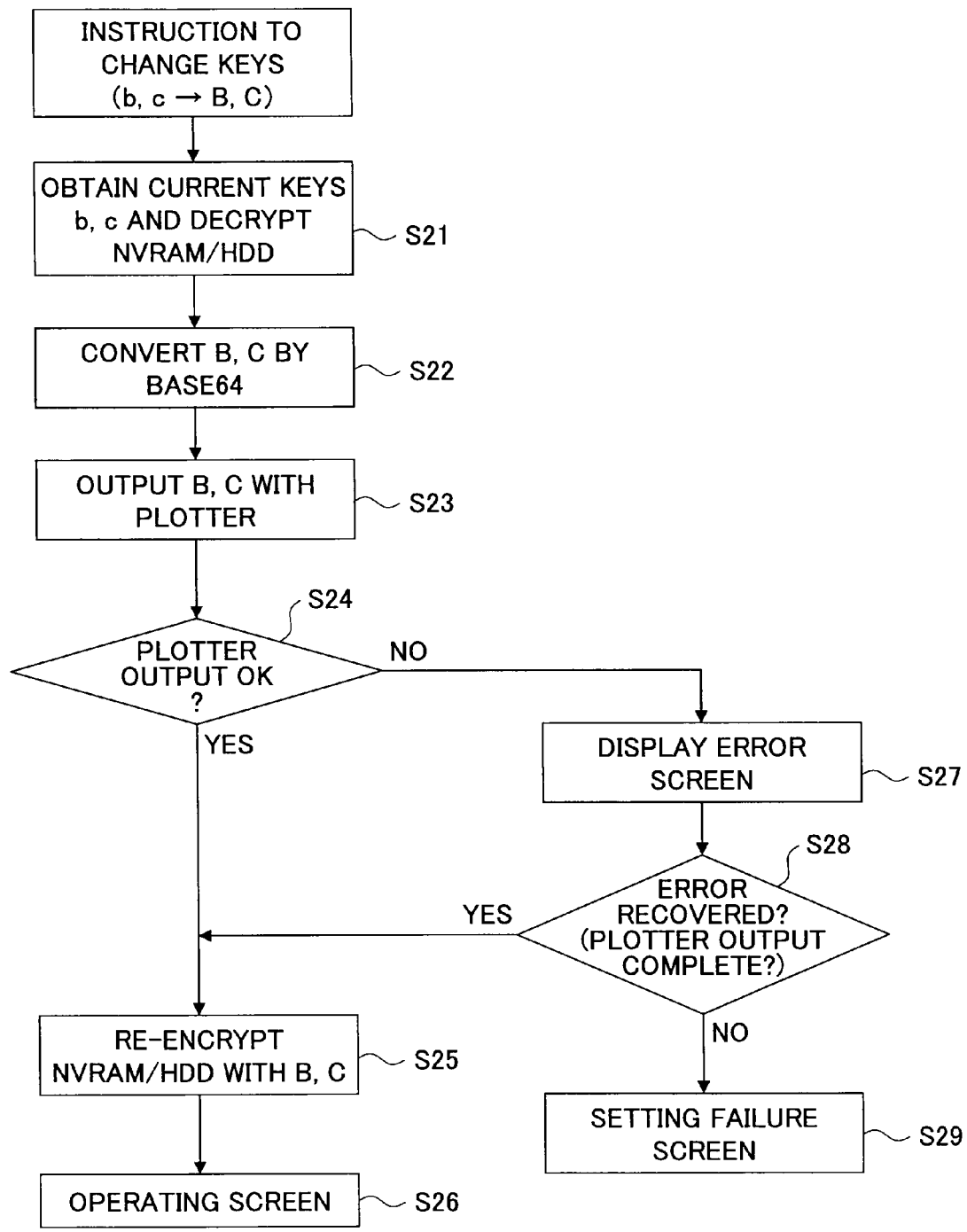
FIG. 29 shows a flowchart of an encryption key setting sequence of the multifunction peripheral of FIG. 28.

FIG. 29 shows a flowchart of an encryption key setting sequence for the multifunction peripheral 100 according to the present embodiment. Upon reception of a key change instruction (encryption keys b, c→encryption keys B, C) via the operating panel or a network, the CTL 115 in step S21 acquires the encryption key A from the TPM 107. The CTL 115 decrypts the encryption keys b and c stored in the USB flash memory 108 that are encrypted with the encryption key A, using the encryption key A. The CTL 115 then acquires the decrypted encryption keys b and c from the USB flash memory 108 and, using the encryption key b, decrypts the NVRAM 112. The CTL 115 also decrypts the HDD 113 with the encryption key c.

In step S22, the CTL 115 converts the new encryption keys B and C into a printable data format such as BASE64. In step S23, the CTL 115 prints the new encryption keys B and C on the sheet 200 with the plotter 110. If the printing by the plotter 110 is successful (YES in S24), the CTL 115 in step S25 again encrypts the NVRAM 112 and the HDD 113 with the new encryption keys B and C. In step S26, the CTL 115 causes an operating screen to be displayed on the operating panel and ends the setting of the encryption keys.

If the printing of the encryption keys B and C by the plotter 110 is unsuccessful for some reason, such as due to the running out of sheets (NO in S24), the CTL 115 in step S27 displays an error screen on the operating panel. In step S28, the CTL 115 determines whether the error situation has been overcome. Upon completion of printing by the plotter 110, the CTL 115 determines that the error situation has been overcome.

If the error situation is not overcome after a predetermined time (NO in S28), the CTL 115 in step S29 causes an encryption key setting failure screen to be displayed on the operating panel. If the error situation is overcome by the predetermined time (YES in S28), the CTL 115 proceeds to step S25.

Thus, the multifunction peripheral 100 according to the present embodiment produces an output of the sheet 200 on which the encryption keys B and C are printed in the encryption key setting sequence. As a result, failure to back up the encryption keys B and C can be prevented and recovery of the keys can be ensured.

Figure 30:
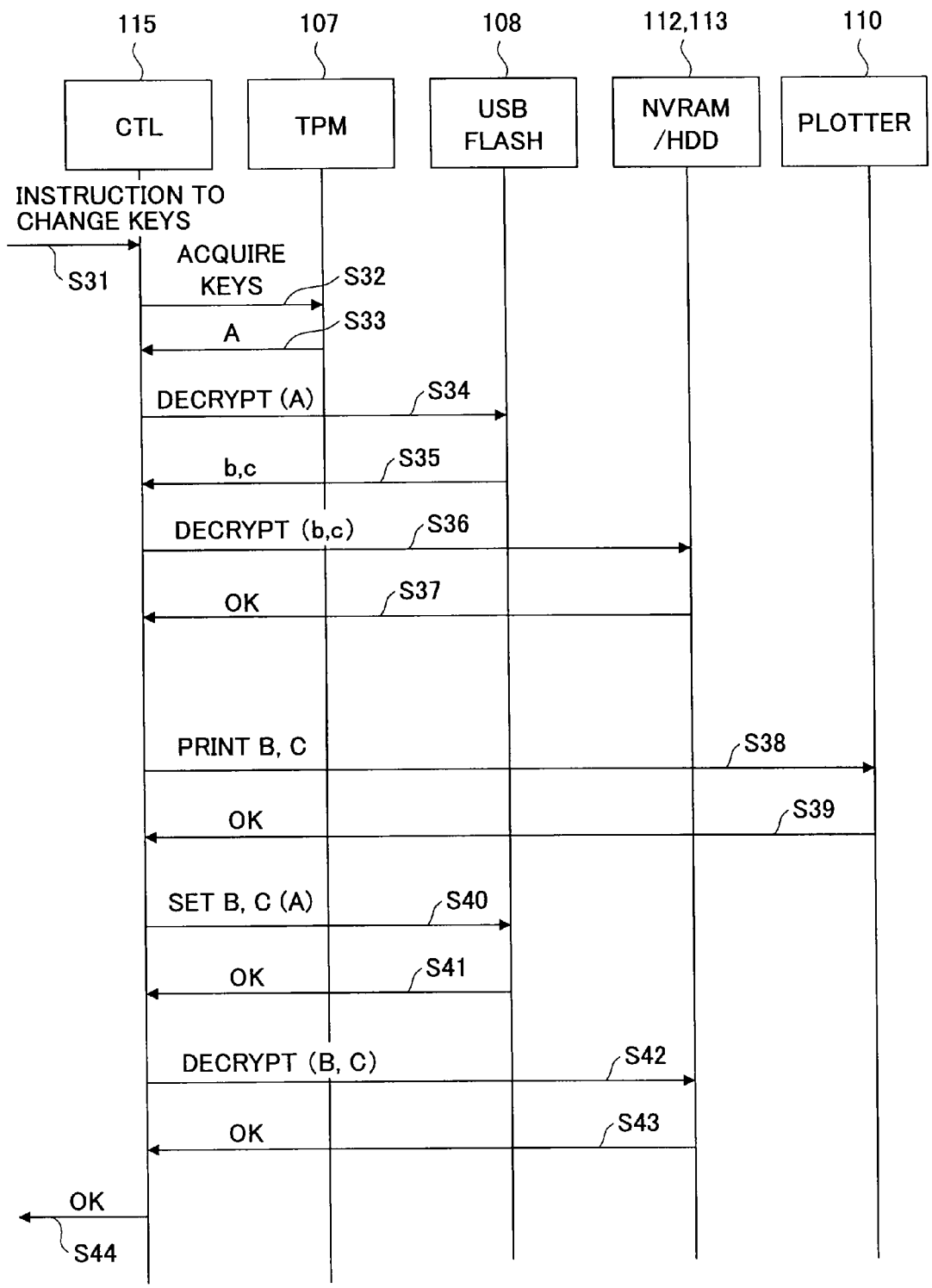
FIG. 30 shows a sequence chart of the encryption key setting sequence of the multifunction peripheral of FIG. 28.

FIG. 30 shows an encryption key setting sequence in the case of a successful printing of the new encryption keys B and C. In step S31, the CTL 115 receives a key change instruction (encryption keys b, c→encryption keys B, C) via the operating panel or a network. In steps S32 and S33, the CTL 115 acquires the encryption key A from the TPM 107.

In steps S34 and S35, the CTL 115 decrypts the encryption keys b and c stored in the USB flash memory 108 that are encrypted with the encryption key A, using the encryption key A, and then acquires the decrypted encryption keys b and c from the USB flash memory 108. In steps S36 and S37, the CTL 115 decrypts the NVRAM 112 and the HDD 113 with the encryption keys b and c.

In steps S38 and S39, the CTL 115 prints the new encryption keys B and C on the sheet 200 with the plotter 110. Because the printing of the encryption keys B and C has been successful, the CTL 115 in steps S40 and S41 encrypts the encryption keys B and C with the encryption key A and then stores the encryption keys B and C in the USB flash memory 108.

In steps S42 and S43, the CTL 115 again encrypts the NVRAM 112 and the HDD 113 with the new encryption keys B and C. The new encryption keys B and C having been successfully set, the CTL 115 in step S44 causes the operating screen to be displayed on the operating panel and ends the setting of the encryption keys.

Figure 31:
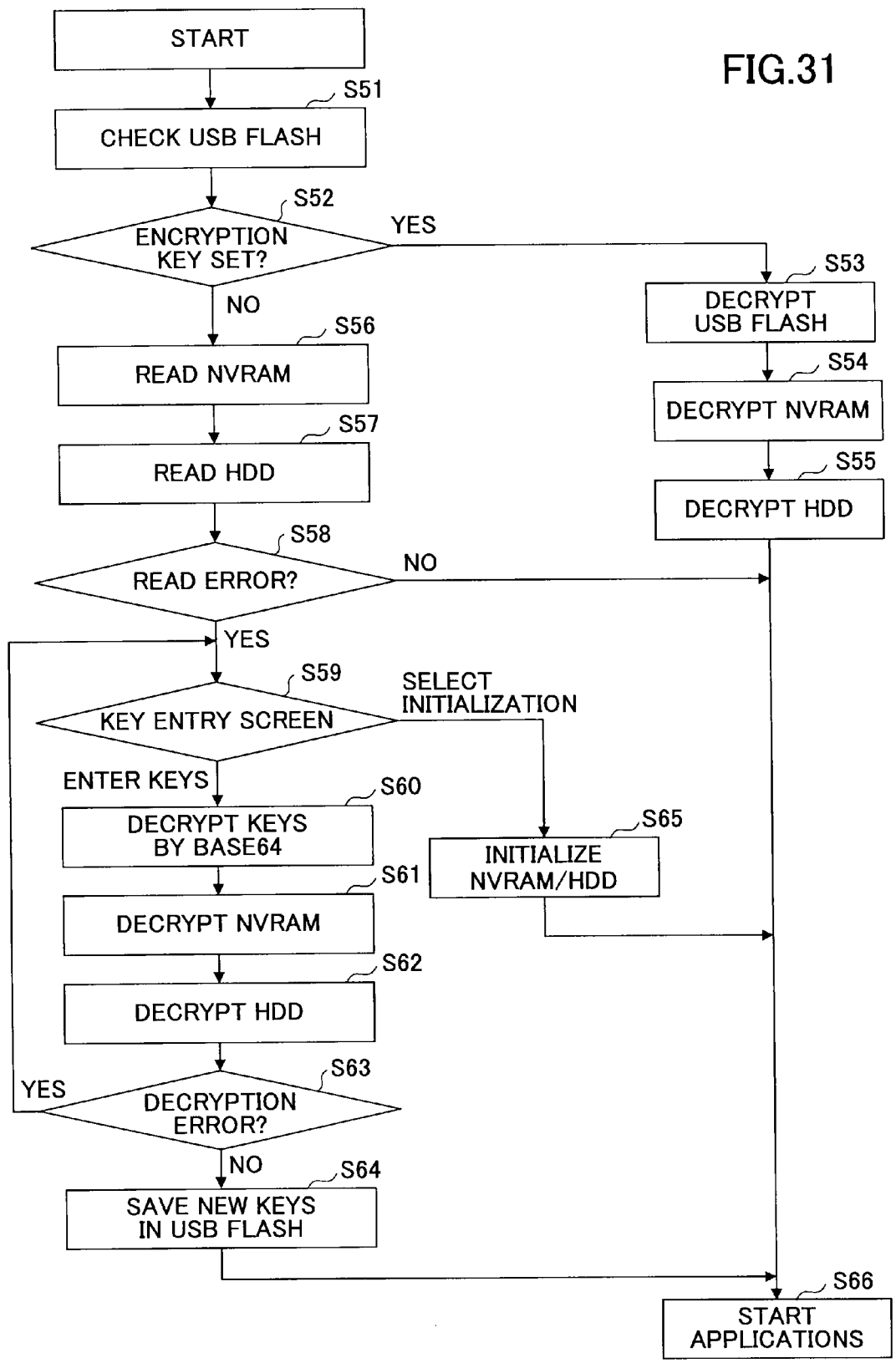
FIG. 31 shows a flowchart of a start-up sequence of the multifunction peripheral of FIG. 28.

FIG. 31 shows a flowchart of a start-up sequence of the multifunction peripheral 100. FIG. 32 shows a sequence chart of the start-up sequence of the multifunction peripheral 100 after replacement of the controller board.

After the multifunction peripheral 100 is turned on, the CTL 115 acquires the encryption key A or A' from the TPM 107 and then determines whether an encryption key is set in the USB flash memory 108 in steps S51 and S52.

If an encryption key is set (YES in S52), the CTL 115 in step S53 decrypts the encryption keys B and C stored in the USB flash memory 108 that are encrypted with the encryption key A, using the encryption key A.

In step S54, the CTL 115 acquires the decrypted encryption key B from the USB flash memory 108, and decrypts the NVRAM 112 with the encryption key B. The CTL 115 in step S55 acquires the decrypted encryption key C from the USB flash memory 108 and decrypts the HDD 113 with it. In step S66, the multifunction peripheral 100 starts up the individual applications using the application control software 116.

If no encryption key is set (NO in S52), the CTL 115 determines that the NVRAM 112 and the HDD 113 are not encrypted. No encryption key is set in the USB flash memory 108 after replacement of the controller board 101, for example.

In step S56, the CTL 115 reads various parameters from the NVRAM 112 in plain text. In step S57, the CTL 115 reads data from the HDD 113 in plain text.

In step S58, the CTL 115 reads various parameters from the NVRAM 112 and determines whether a read error occurred during the reading of data from the HDD 113. If the parameters and data stored in the NVRAM 112 and the HDD 113 are encrypted after replacement of the controller board 101, a read error develops when they are read in plain text, for example. If no read error develops (NO in S58), the CTL 115 in step S66 starts up the individual applications using the application control software 116.

If a read error occurs (YES in S58), the CTL 115 in step S59 causes the screen 1000 shown in FIG. 11 to be displayed on the operating panel, prompting the selection of restoration of the encryption keys or initialization of the storage device.

FIG. 11 shows an example of the screen prompting the selection of restoration of the encryption keys or initialization of the storage device. The screen 1000 includes a button 1001 for selecting restoration of the encryption keys and a button 1002 for selecting the initialization of the storage device. When the button 1001 is depressed by the user, the CTL 115 displays a screen 1100 shown in FIG. 12 on the operating panel.

FIG. 12 shows an example of the screen for restoring the encryption keys. The screen 1100 of FIG. 12 includes input columns for entering encryption keys for the NVRAM 112 and the HDD 113. A user enters the encryption keys B and C for the NVRAM 112 and the HDD 113 that are printed on the sheet 200 manually via the operating panel while the screen 1100 is being displayed on the operating panel.

As the encryption keys for the NVRAM 112 and the HDD 113 are entered via the operating panel, the CTL 115 in step S60 decrypts the encryption keys B and C that are in a printable data format such as BASE64. In steps S61 and S62, the CTL 115 attempts to decrypt the NVRAM 112 and the HDD 113 with the decrypted encryption keys B and C.

If no decryption error develops in step S63 (NO in S63), the CTL 115 in step S64 encrypts the encryption keys entered on the screen 1100 as new encryption keys for the NVRAM 112 and the HDD 113 with the encryption key A', and saves the encrypted keys in the USB flash memory 108. In step S66, the CTL 115 starts up the individual applications using the application control software 116.

If a decryption error develops (YES in S63), the CTL 115 displays the screen 1000 on the operating panel again back in step S59. When the button 1002 on the screen 1000 is depressed by the user, the CTL 115 in step S65 initializes the NVRAM 112 and the HDD 113. In step S66, the CTL 115 starts up the applications with the application control software 116.

In the event of loss of the sheet 200 on which the encryption keys B and C are printed or failure to back up the encryption keys B and C, the parameters or data stored encrypted in the NVRAM 112 and the HDD 113 cannot be recovered. Thus, the button 1002 is provided on the screen 1000 for allowing the user to select whether the NVRAM 112 and the HDD 113 should be initialized.

While the screen 1100 is based on the assumption that both the NVRAM 112 and the HDD 113 are encrypted, one or the other alone may be encrypted. In this case, the storage device that is not encrypted may not be included in the screen 1100. Furthermore, decrypting of the unencrypted storage device may be skipped.

FIG. 32 shows a sequence chart of a start-up sequence for the multifunction peripheral 100 when the new encryption keys are restored after replacement of the controller board. After the multifunction peripheral 100 is turned on, the CTL 115 acquires the encryption key A' from the TPM 107 and then determines whether an encryption key is set in the USB flash memory 108.

Because this is after replacement of the controller board 101, no encryption key is set in the USB flash memory 108. Therefore, the CTL 115 determines that the NVRAM 112 and the HDD 113 are not encrypted.

In step S71, the CTL 115 reads various parameters and data from the NVRAM 112 and the HDD 113 in plain text. A read error develops because the parameters and data are encrypted after replacement of the controller board 101.

Due to the read error, the CTL 115 in steps S73 and S74 causes the screen 1000 shown in FIG. 11 to be displayed on the operating panel 118, prompting the selection of restoration of the encryption keys or initialization of the storage device. When the button 1001 is depressed by the user, the CTL 115 causes the screen 1100 shown in FIG. 12 to be displayed on the operating panel 118, prompting the entry of the encryption keys for the NVRAM 112 and the HDD 113.

The user manually enters the encryption keys B and C for the NVRAM 112 and the HDD 113 printed on the sheet 200 via the operating panel 118. The CTL 115 acquires the encryption keys B and C, which are converted in a printable data format such as BASE64, via the operating panel 118, and then decrypts them.

In steps S75 and S76, attempts are made to decrypt the NVRAM 112 and the HDD 113 with the decrypted encryption keys B and C. Because no decryption error is caused, the CTL 115 in steps S77 and S78 encrypts the new encryption keys, i.e., the decrypted encryption keys B and C, with the encryption key A' and then saves the encrypted keys in the USB flash memory 108. Thereafter, the CTL 115 starts up the individual applications with the application control software 116.

Embodiment 9

While it has been described above that the encryption keys B and C are stored in the USB flash memory 108 as encrypted with the encryption key A, the configuration shown in FIG. 13 as described above may be employed in connection with the foregoing embodiment.

Furthermore, the example shown in FIG. 14 as described above may also be employed in connection with the foregoing embodiment.

The multifunction peripheral 100 in which the encryption key C is stored as shown in FIG. 13 is started up in accordance with the flowchart shown in FIG. 15.

After the multifunction peripheral 100 is turned on, the CTL 115 acquires the encryption key A or A' from the TPM 107 and then determines in steps S81 and S82 whether an encryption key is set in the USB flash memory 108.

If the encryption key is set (YES in S82), the CTL 115 in step S83 decrypts the encryption keys B and C stored in the USB flash memory 108 that are encrypted with the encryption key A, using the encryption key A.

In step S84, the CTL 115 acquires the decrypted encryption key B from the USB flash memory 108, and decrypts the NVRAM 112 with the encryption key B. In step S85, the CTL 115 acquires the decrypted encryption key C from the USB flash memory 108 and decrypts the HDD 113. In step S96, the multifunction peripheral 100 starts up each application using the application control software 116.

If the encryption key is not set (NO in S82), the CTL 115 determines that the NVRAM 112 and the HDD 113 are not encrypted. No encryption key is set in the USB flash memory 108 after replacement of the controller board 101, for example.

In step S86, the CTL 115 reads various parameters from the NVRAM 112 in plain text. In step S87, the CTL 115 reads data from the HDD 113 in plain text.

In step S88, the CTL 115 determines whether a read error has occurred during the reading of the various parameter from the NVRAM 112 or data from the HDD 113. A read error occurs when, for example, the parameters and data that are read from the NVRAM 112 and the HDD 113 in plain text are encrypted after replacement of the controller board 101. If no read error occurs (NO in S88), the CTL 115 in step S96 starts up each application using the application control software 116.

In the event of a read error (YES in S88), the CTL 115 in step S89 causes the screen 1000 shown in FIG. 11 to be displayed on the operating panel for the selection of either restoration of the encryption key or initialization of the storage device. Upon selection of restoration of the encryption keys, the CTL 115 causes the screen 1100 of FIG. 12 to be displayed on the operating panel. The user manually enters the encryption key B for the NVRAM 112 that is printed on the sheet 200 via the operating panel while the screen 1100 is being displayed on the operating panel.

As the encryption key B for the NVRAM 112 is entered via the operating panel, the CTL 115 in step S90 decrypts the encryption key B that is in a printable data format, such as BASE64. The CTL 115 then attempts to decrypt the NVRAM 112 with the decrypted encryption key B.

If no decryption error occurs in step S91, the CTL 115 in step S92 encrypts, with the encryption key A', the encryption key for the NVRAM 112 that has been entered on the screen 1100 as a new encryption key, and then stores it in the USB flash memory 108.

In step S93, the CTL 115 obtains the encryption key C for the HDD 113 from the NVRAM 112. In step S94, the CTL 115 decrypts the HDD 113 with the encryption key C. After encrypting the encryption key C as a new encryption key for the HDD 113 with the encryption key A', the CTL 115 stores the encrypted encryption key C in the USB flash memory 108. In step S96, the CTL 115 starts up each application using the application control software 116.

In the event of a decryption error (YES in S91), the CTL 115 causes the screen 1000 to be displayed on the operating panel again back in step S89. Upon selection of initialization of the storage device, the CTL 115 in step S95 initializes the NVRAM 112 and the HDD 113. In step S96, the CTL 115 then starts up each application using the application control software 116.

The encryption keys B and C may be configured as shown in the conceptual diagram of FIG. 16 which has been described above.

Embodiment 10

FIGS. 33A and 33B show conceptual charts illustrating a data recovery method according to another embodiment. FIG. 33A shows the multifunction peripheral 100 prior to the replacement of the controller board 101. FIG. 33B shows the multifunction peripheral 100 after replacement of the controller board 101.

In the multifunction peripheral 100 according to the present embodiment, while the controller board 101 is normally operating, the encryption keys B and C stored in the USB flash memory 108 are printed on the sheet 200 by the plotter 110. Upon printing, the encryption keys B and C are converted into a printable data format such as BASE64 or Quoted-Printable.

After replacement of the controller board 101, the encryption keys B and C printed on the sheet 200 are read with the scanner 111, and the characters on the sheet 200 are encoded with the OCR 501. By then decrypting the encryption keys B and C which are in a printable data format such as BASE64, the encryption keys B and C are restored into the USB flash memory 108.

Thus, in the multifunction peripheral 100 of the present embodiment, the parameters and data stored in the NVRAM 112 and the HDD 113 that are encrypted with the encryption keys B and C can be decrypted even after replacement of the controller board 101. Furthermore, in the multifunction peripheral 100 of the embodiment, because the sheet 200 is read with the scanner 111, the trouble of manual entry can be eliminated.

Figure 34:
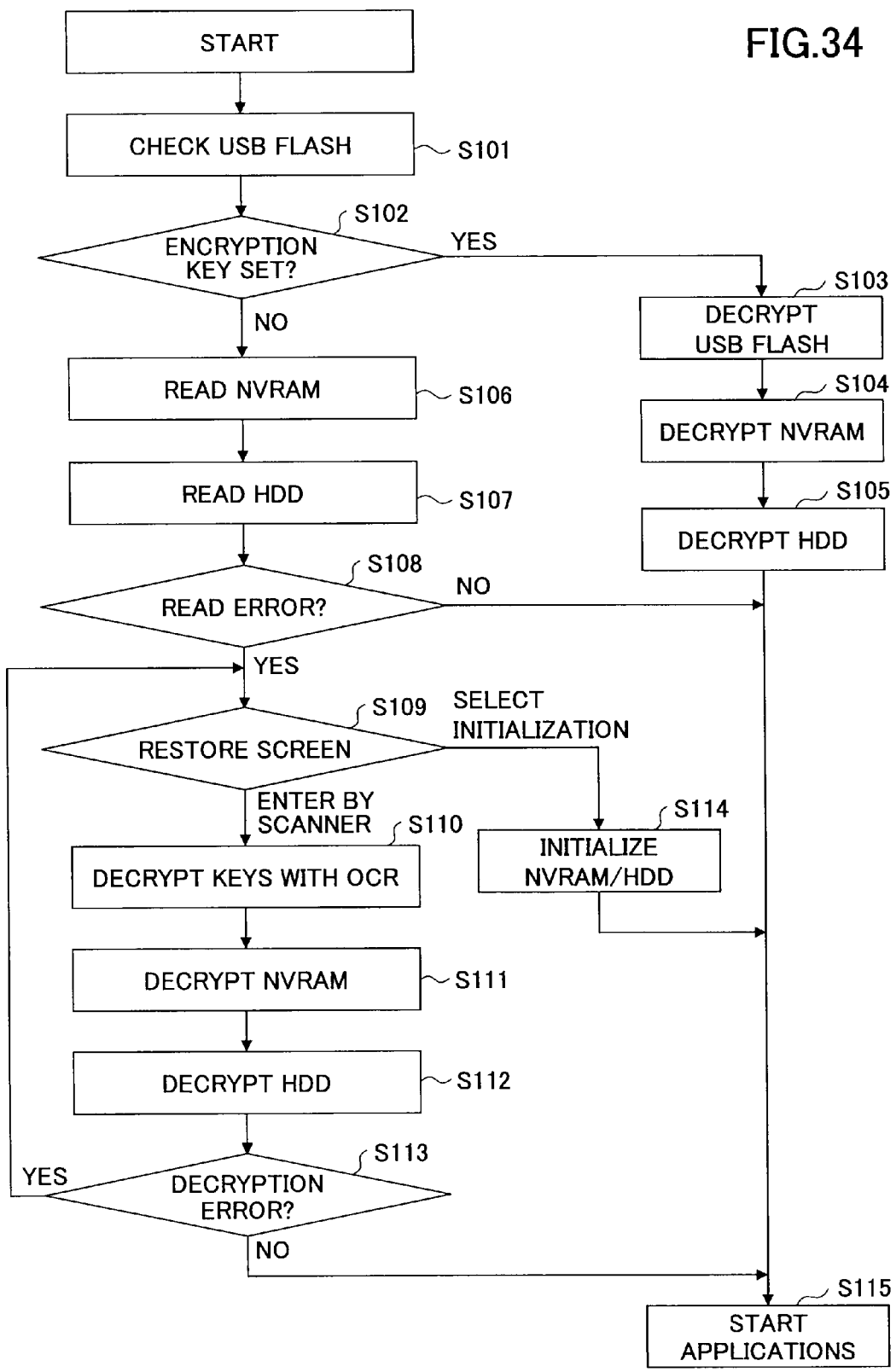
FIG. 34 shows a flowchart of a start-up sequence of the multifunction peripheral of FIG. 33.

FIG. 34 shows a flowchart of a start-up sequence of the multifunction peripheral 100 after replacement of the multifunction peripheral 100. After turning power on, in steps S101 and S102, the CTL 115 acquires the encryption key A or A' from the TPM 107 and determines whether an encryption key is set in the USB flash memory 108.

If an encryption key is set (YES in S102), the CTL 115 in step S103 decrypts the encryption keys B and C stored in the USB flash memory 108 that are encrypted with the encryption key A, using the encryption key A.

In step S104, the CTL 115 acquires the decrypted encryption key B from the USB flash memory 108, and then decrypts the NVRAM 112 with the encryption key B. In step S105, the CTL 115 acquires the decrypted encryption key C from the USB flash memory 108 and decrypts the HDD 113 with it. In step S115, the multifunction peripheral 100 starts up the individual applications with the application control software 116.

If no encryption keys are set (NO in S102), the CTL 115 determines that the NVRAM 112 and the HDD 113 are not encrypted. No encryption key is set in the USB flash memory 108 after replacement of the controller board 101, for example.

In step S106, the CTL 115 reads various parameters from the NVRAM 112 in plain text. In step S107, the CTL 115 reads data from the HDD 113 in plain text.

In step S108, the CTL 115 determines if a read error has occurred during the reading of various parameters from the NVRAM 112 or data from the HDD 113. A read error is caused if the parameters and data that are read in plain text from the NVRAM 112 and the HDD 113 are encrypted after replacement of the controller board 101. If no read error is caused (NO in S108), the CTL 115 in step S115 starts up the individual applications with the application control software 116.

If a read error is caused (YES in S108), the CTL 115 in step S109 causes the screen 1000 shown in FIG. 11 to be displayed on the operating panel, prompting the selection of restoration of the encryption keys or initialization of the storage device.

Figure 35:
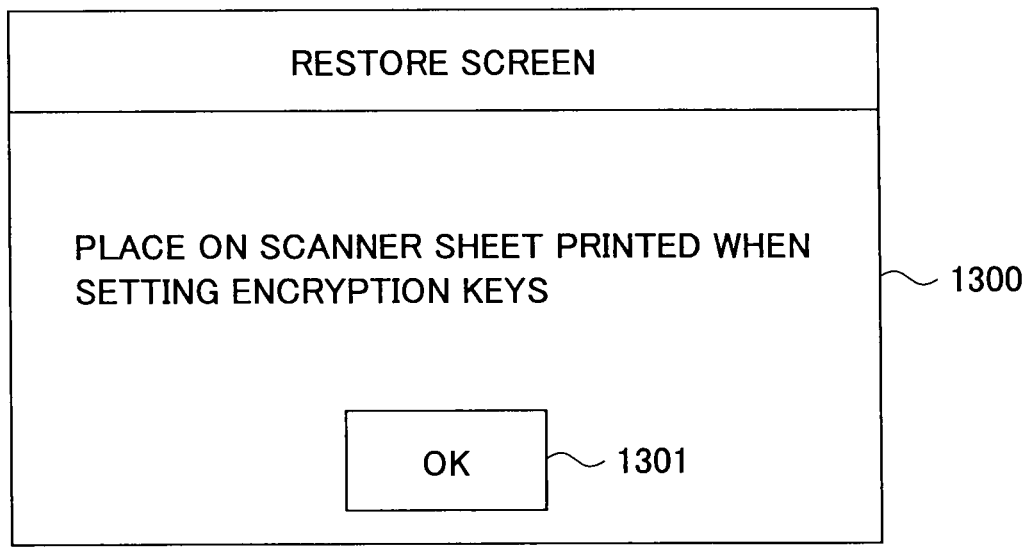
FIG. 35 shows an example of a screen for restoring encryption keys using a scanner.

When the button 1001 is depressed by the user, the CTL 115 causes a screen 1300 to be displayed on the operating panel as shown in FIG. 35.

FIG. 35 is an example of the screen for restoring the encryption keys. The screen 1300 includes a message prompting the user to place the sheet 200, which has the encryption keys B and C printed on it, on the scanner 111. The user places the sheet 200 on the scanner 111 and then presses an OK button 1301.

As the OK button 1301 is depressed, the CTL 115 in step S110 causes the scanner 111 to scan the sheet 200. After the characters read with the scanner 111 from the sheet 200 are encoded by the OCR 501, the CTL 115 decrypts the encryption keys B and C, which have been converted into a printable data format such as BASE64. In steps S111 and S112, the CTL 115 attempts to decrypt the NVRAM 112 and the HDD 113 with the decrypted encryption keys B and C.

In step S113, if no decryption error is caused (NO in S113), the CTL 115 encrypts the encryption keys B and C for the NVRAM 112 and the HDD 113, which have been read from the sheet 200 as new encryption key, with the encryption key A', and then saves the new keys in the USB flash memory 108. In step S115, the CTL 115 starts up the individual applications using the application control software 116.

If a decryption error is caused (YES in S113), the CTL 115 displays the screen 1000 on the operating panel again back in step S109. If the user presses the button 1002, the CTL 115 in step S114 initializes the NVRAM 112 and the HDD 113. In step S115, the CTL 115 then starts up the individual applications with the application control software 116.

Although the invention has been described with reference to particular examples, it will be appreciated by those skilled in the art that various modifications or changes can be made without departing from the scope of the claims.

The present application is based on the Japanese Priority Application Nos. 2007-069651 and 2007-069652 filed Mar. 16, 2007, the entire contents of which are hereby incorporated by reference.

What is claimed is:

1. A data recovery method for an apparatus including a first controller board in which a first encryption key is stored in a first secure memory and a second encryption key encrypted with the first encryption key is stored in a first memory, the apparatus further including a storage unit storing data encrypted with the second encryption key, the method comprising:
    a back-up step in which the second encryption key is decrypted with the first encryption key and the decrypted second encryption key is stored in an external storage device as a backup key; and
    a restoring step in which, when the first controller board is replaced with a second controller including a second secure memory configured to store a third encryption key different from the first encryption key, and a second memory, the decrypted second encryption key is read from the external storage device, the read second encryption key is encrypted with the third encryption key stored in the second secure memory, and the second encryption key that is read from the external storage device and encrypted with the third encryption key is stored.

2. The data recovery method according to claim 1, wherein the back-up step comprises encrypting the second encryption key using a password entered by an operator and then backing up the encrypted second encryption key in a detachable third storage unit as the backup key.

3. The data recovery method according to claim 2, wherein the restoring step comprises decrypting the backup key using the password and then restoring the backup key within the apparatus.

4. The data recovery method according to claim 1, wherein the back-up step comprises encrypting the second encryption key using a password entered by an operator and backing up the encrypted second encryption key in a server connected via a network as the backup key.

5. The data recovery method according to claim 4, wherein the restoring step comprises transmitting identifying information of the apparatus to the server, receiving the backup key corresponding to the identifying information from the server, decrypting the backup key using the password, and restoring the backup key within the apparatus.

6. The data recovery method according to claim 1, wherein, when there are plural of the second encryption keys, one of the second encryption keys is backed up outside the apparatus as a backup key, wherein the rest of the second encryption keys are encrypted with the one of the second encryption keys and stored in the storage unit.

7. The data recovery method according to claim 1, wherein the second encryption key comprises a fixed portion and a variable portion, and the restoring step further comprising generating the backup key based on the fixed portion of the second encryption key and the variable portion of the second encryption key that is entered by an operator, and restoring the backup key within the apparatus.

8. The data recovery method according to claim 1, wherein the first secure memory is mounted on the first controller board for overall control, and the first encryption key is stored in a read-only non-volatile region.

9. The data recovery method according to claim 1, wherein the backup key is restored and the data stored in the storage unit is decrypted when the first controller board is replaced with the second controller.

10. The data recovery method according to claim 1, wherein the apparatus is configured to perform one or more of copying, printing, faxing, and scanning functions.

11. The data recovery method according to claim 1, wherein, when the first controller board is replaced with the second controller, the first controller board is detached from the apparatus and the second controller is attached to the apparatus.

12. An apparatus comprising:
a first controller board including a first secure memory configured to store a first encryption key, and a first memory configured to store a second encryption key encrypted with the first encryption key;
a storage unit configured to store data encrypted with the second encryption key;
a backup unit configured to decrypt the second encryption key with the first encryption key, and to store the decrypted second encryption key in an external storage device as a backup key; and
a restore unit, when the first controller board is replaced with a second controller including a second secure memory configured to store a third encryption key different from the first encryption key, and a second memory, configured to read the decrypted second encryption key from the external storage device, and to encrypt the read second encryption key with the third encryption key stored in the second secure memory, and to store the second encryption key that is read from the external storage device and encrypted with the third encryption key.

13. The apparatus according to claim 12, wherein the backup unit is configured to encrypt the second encryption key using a password entered by an operator, and back up the second encryption key in a detachable third storage unit as a backup key.

14. The apparatus according to claim 13, wherein the restore unit is configured to decrypt the backup key using the password and restore the backup key within the apparatus.

15. The apparatus according to claim 12, wherein the backup unit is configured to encrypt the second encryption key using a password entered by an operator, and then back up the second encryption key in a server connected via a network as a backup key.

16. The apparatus according to claim 15, wherein the restore unit is configured to:
transmit identifying information of the apparatus to the server;
receive the backup key corresponding to the identifying information from the server;
decrypt the backup key using the password; and
restore the backup key within the apparatus.

17. The apparatus according to claim 12, wherein when there are plural of the second encryption keys, one of the second encryption keys is backed up outside the apparatus as a backup key, and the rest of the second encryption keys are encrypted with the one of the second encryption keys and stored in the storage unit.

18. The apparatus according to claim 12, wherein the second encryption key comprises a fixed portion and a variable portion, the restore unit being further configured to:
generate the backup key based on the fixed portion of the second encryption key and the variable portion of the second encryption key that is entered by an operator; and
restore the backup key within the apparatus.

19. The apparatus according to claim 12, wherein the first secure memory is mounted on the first controller board for overall control, and the first encryption key is stored in a read-only non-volatile region.

20. An apparatus comprising:
a plotter;
a first controller board including a first secure memory configured to store a first encryption key, and a first memory configured to store a second encryption key encrypted with the first encryption key;
a storage unit configured to store data encrypted with the second encryption key;
a backup unit configured to decrypt the second encryption key with the first encryption key, and configured to cause the plotter to print the decrypted second encryption key on a sheet as a backup key; and
a restore unit, when the first controller board is replaced with a second controller including a second secure memory configured to store a third encryption key different from the first encryption key, and a second memory, configured to read the decrypted second encryption key from the sheet, and to encrypt the read second encryption key with the third encryption key stored in the second secure memory, and to store the second encryption key that is read from the sheet and encrypted with the third encryption key.

* * * * *